(12) United States Patent
Kishida et al.

(10) Patent No.: US 8,499,651 B2
(45) Date of Patent: Aug. 6, 2013

(54) DETECTING DEVICE

(75) Inventors: Takeo Kishida, Chiba (JP); Toshimitsu Tsuboi, Tokyo (JP); Tetsuharu Fukushima, Tokyo (JP); Shizuka Yata, Nagano (JP)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 13/171,525

(22) Filed: Jun. 29, 2011

(65) Prior Publication Data

US 2011/0252896 A1    Oct. 20, 2011

Related U.S. Application Data

(63) Continuation of application No. 12/181,369, filed on Jul. 29, 2008, now Pat. No. 7,984,658.

(30) Foreign Application Priority Data

Jul. 31, 2007 (JP) ................. P2007-199221

(51) Int. Cl.
*G01L 1/26* (2006.01)
(52) U.S. Cl.
USPC ..................................... 73/862.391
(58) Field of Classification Search
USPC ..................................... 73/862.391
See application file for complete search history.

(56) References Cited

U.S. PATENT DOCUMENTS

| | | | |
|---|---|---|---|
| 5,092,645 A | 3/1992 | Okada | |
| 5,844,146 A | 12/1998 | Murray et al. | |
| 5,871,248 A | 2/1999 | Okobaa et al. | |
| 6,188,331 B1 | 2/2001 | Zee et al. | |
| 7,663,362 B2 * | 2/2010 | Kishida et al. | ........ 324/244 |

FOREIGN PATENT DOCUMENTS

| | | |
|---|---|---|
| JP | 2004 226380 | 8/2004 |
| JP | 2006 10407 | 1/2006 |
| JP | 2006 47145 | 2/2006 |

* cited by examiner

*Primary Examiner* — Lisa Caputo
*Assistant Examiner* — Octavia D. Hollington
(74) *Attorney, Agent, or Firm* — Frommer Lawrence & Haug LLP; William S. Frommer

(57) ABSTRACT

A detecting device including a pressure sensor that is deformed by a load from an outside and causes stress dispersion includes a slip detecting unit that calculates a pressure center position using a pressure value detected by the pressure sensor, calculates a movement value of the calculated pressure center position using a temporal change of the pressure center position, and detects a slip on the basis of the calculated movement value of the pressure center position. The pressure sensor has a multilayer structure in which two detecting units that detect pressure are arranged to hold a viscoelastic body made of a viscoelastic material that is deformed by a load from the outside.

12 Claims, 16 Drawing Sheets

DETECTING DEVICE

CROSS-REFERENCES TO RELATED APPLICATIONS

This is a continuation of application Ser. No. 12/181,369, filed Jul. 29, 2008, now U.S. Pat. No. 7,984,658 which is entitled to the priority filing date of Japanese application P2007-199221 filed on Jul. 31, 2007, the entirety of which is incorporated herein by reference.

The present invention contains subject matter related to Japanese Patent Application JP 2007-199221 filed in the Japanese Patent Office on Jul. 31, 2007, the entire contents of which being incorporated herein by reference.

BACKGROUND OF THE INVENTION

1. Field of the Invention

The present invention relates to a detecting device, and, more particularly to a detecting device adapted to be capable of acquiring information on a slip necessary for stable gripping, skillful manipulation, and the like of an object by a robot hand.

2. Description of the Related Art

General tactile sensors in the past are classified into five types described below.

1. Examples of a sensor for contact (presence or absence of contact and confirmation of approach) include a limit switch, a pressure sensor, an optical sensor, a Hall element, and a capacitance sensor.

2. Examples of a sensor for a sense of pressure (pressure, a force, and a gripping force) include a semiconductor pressure sensor, a strain gauge, a motor potential sensor, and a spring displacement sensor.

3. Examples of a sensor for distributed tactile senses (a pressure distribution and a force distribution) include a pressure sensitive rubber+an electrode film, a pressure sensitive polymeric film+an electrode plate, an optical sensor+a rubber plate, and an integrated semiconductor pressure sensor.

4. Examples of a sensor for a sense of slip (relative displacement, slip oscillation, and a shearing force) include a roller or a ball+an encoder, an oscillation sensor, and a three-dimensional tactile sensor.

5. Examples of a sensor for a sense of force (a force and a moment) include a strain gauge+a structure, a strain block, an optical sensor+a spring, and a driving force sensor.

To perform complicated control such as stable gripping and skillful manipulation of an object by a robot hand, it is necessary to acquire gripping states such as a slip between the gripped object and fingers.

A tactile sensor for acquiring a gripping state among the tactile sensors described above, for example, JP-A-2006-47145 discloses a sensor having a multilayer structure in which a distributed pressure sensor and a flexible viscoelastic body are combined.

JP-A-2006-10407 discloses a detection sensor that includes a pressure sensitive element and a piezoelectric element and realizes detection of a sense of slip by performing a waveform analysis of the piezoelectric element and detection of a sense of force using the pressure sensitive element.

Moreover, JP-A-2004-226380 discloses a tactile sensor in which respective contact terminals of an element for detecting the pressure in the vertical direction and an element for detecting the pressure in a shearing direction are arranged not to overlap each other on a sensor surface and that obtains a sense of slip on the basis of a shearing force and a vertical force detected from the elements.

SUMMARY OF THE INVENTION

However, the sensor disclosed in JP-A-2006-47145 measures a shape or a dynamic characteristic of a pressed object (elasticity and viscoelasticity of an object) and does not measure a sense of slip. The sensor disclosed in JP-A-2006-10407 detects oscillation due to a stick slip. Therefore, even if a slip itself can be detected, it is difficult to detect a direction of the slip.

The sensor disclosed in JP-A-2004-226380 obtains a sense of slip. However, this sense of slip is a sense of slip based on stick slip oscillation due to friction with an object, which is obtained by using the pressure in a shearing direction. In other words, when a signal of the pressure in the shearing direction is generated in a certain frequency range, the sensor obtains the pressure as a sense of slip.

As described above, the various kinds of tactile sensors are present in the related-art. However, as a sensor that acquires a slip between a gripped object and fingers necessary for performing complicated control such as stable gripping and skillful manipulation of an object by a robot hand, relatively few sensors are found other than the sensor disclosed in JP-A-2004-226380 that acquires a sense of slip based on stick slip oscillation due to friction with an object.

Therefore, besides the sensor, a proposal for more surely acquiring information on a slip necessary for stable gripping, skillful manipulation, and the like of an object by a robot hand is immediately necessary.

Therefore, it is desirable to make it possible to more surely acquire information on a slip necessary for stable gripping, skillful manipulation, and the like of an object by a robot hand.

According to an embodiment of the present invention, there is provided a detecting device including a pressure sensor that is deformed by a load from the outside and causes stress dispersion. The detecting device includes slip detecting means for calculating a pressure center position using a pressure value detected by the pressure sensor, calculating a movement value of the calculated pressure center position using a temporal change of the pressure center position, and detecting a slip on the basis of the calculated movement value of the pressure center position. The pressure sensor has a multilayer structure in which two detecting units that detect pressure are arranged to hold a viscoelastic body made of a viscoelastic material that is deformed by a load from the outside.

The slip detecting means can calculate a pressure center position from a pressure distribution generated in the viscoelastic body by stress dispersion detected by a first one of the detecting units, calculate a pressure center position from a pressure distribution generated in the viscoelastic body by stress dispersion detected by a second one of the detecting units, and calculate a difference between the pressure center positions.

The slip detecting means can detect the slip on the basis of the calculated difference.

The slip detecting means can detect, on the basis of the calculated difference, a shearing force applied to the pressure sensor.

The slip detecting means can calculate, from a pressure distribution generated in the viscoelastic body by stress dispersion detected by a first one of the detecting units and a pressure distribution generated in the viscoelastic body by stress dispersion detected by a second one of the detecting units, a difference between propagation speed of pressure detected by the first detecting unit and propagation speed of pressure detected by the second detecting unit.

The slip detecting means can detect the slip on the basis of the calculated difference.

The slip detecting means can judge whether a movement value of the calculated pressure center position is equal to or larger than a predetermined threshold and, when it is judged that the movement value of the pressure center position is equal to or larger than the predetermined threshold, detect the slip.

The slip detecting means can judge whether a sum of movement values of the calculated pressure center position is equal to or larger than a predetermined threshold and, when it is judged that the sum of the movement values of the pressure center position is equal to or larger than the predetermined threshold, detect the slip.

The slip detecting means can multiply the movement values of the calculated pressure center position with coefficients corresponding to levels of the movement values of the pressure center position to calculate a sum of the movement values of the pressure center position.

The slip detecting means can calculate a difference of a movement average value of the calculated pressure center position to calculate a movement value of the pressure center position.

The slip detecting means can calculate a difference of the calculated pressure center position to calculate a movement value of the pressure center position.

The pressure sensor includes plural elements. The slip detecting means can detect, using a pressure value detected by the pressure sensor, an element that performs detection of contact of an object with the pressure sensor and calculate a movement value of the pressure center position using a pressure value from the detected element.

The pressure sensor can have a viscoelastic body made of a viscoelastic material on a surface thereof.

The viscoelastic body can be integrated with thin-film silicon rubber by a two-color molding method.

The viscoelastic body can be molded with an electrostatic shield material mixed therein.

The viscoelastic body and the pressure sensor can be integrated with thin-film silicon rubber by a two-color molding method.

A detecting device according to an embodiment of the present invention is a detecting device including a pressure sensor that is deformed by a load from the outside and causes stress dispersion. In the detecting device, a pressure center position is calculated by using a pressure value detected by the pressure sensor, a movement value of the pressure center position is calculated by using a temporal change of the calculated pressure center position, a slip is detected on the basis of the calculated movement value of the pressure center position, and the pressure sensor has a multilayer structure in which two detecting units that detect pressure are arranged to hold a viscoelastic body made of a viscoelastic material that is deformed by a load from the outside.

According to the present invention, it is possible to more surely acquire information on a slip necessary for stable gripping, skillful manipulation, and the like of an object by a robot hand.

DESCRIPTION OF THE PREFERRED EMBODIMENTS

Embodiments of the present invention will be hereinafter explained. A correspondence relation between elements of the present invention and the embodiments described or shown in the specification or the drawings is described as follows. This description is a description for confirming that the embodiments supporting the present invention are described or shown in the specification or the drawings. Therefore, even if there is an embodiment that is described or shown in the specification or the drawings but is not described herein as an embodiment corresponding to an element of the present invention, this does not means that the embodiment does not correspond to the element. Conversely, even if an embodiment is described herein as an embodiment corresponding to an element of the present invention, this does not means that the embodiment does not correspond to elements other than the element.

A detecting device according to an embodiment of the present invention is a detecting device including a pressure sensor (e.g., a sensor 21 shown in FIG. 3) that is deformed by a load from the outside and causes stress dispersion. The detecting device includes slip detecting means (e.g., a signal processing unit 53 shown in FIG. 6) for calculating a pressure center position using a pressure value detected by the pressure sensor, calculating a movement value of the calculated pressure center position using a temporal change of the pressure center position, and detecting a slip on the basis of the calculated movement value of the pressure center position. The pressure sensor has a multilayer structure in which two detecting units (e.g., pressure detecting units 42-1 and 42-2 shown in FIG. 3) that detect pressure are arranged to hold a viscoelastic body (e.g., a deforming section 41 shown in FIG. 3) made of a viscoelastic material that is deformed by a load from the outside.

The slip detecting means can calculate a pressure center position from a pressure distribution generated in the viscoelastic body by stress dispersion detected by a first one of the detecting units, calculate a pressure center position from a pressure distribution generated in the viscoelastic body by stress dispersion detected by a second one of the detecting units, and calculate a difference (e.g., a distance "d" shown in FIG. 13) between the pressure center positions.

An embodiment of the present invention is explained below with reference to the accompanying drawings.

Figure 1:
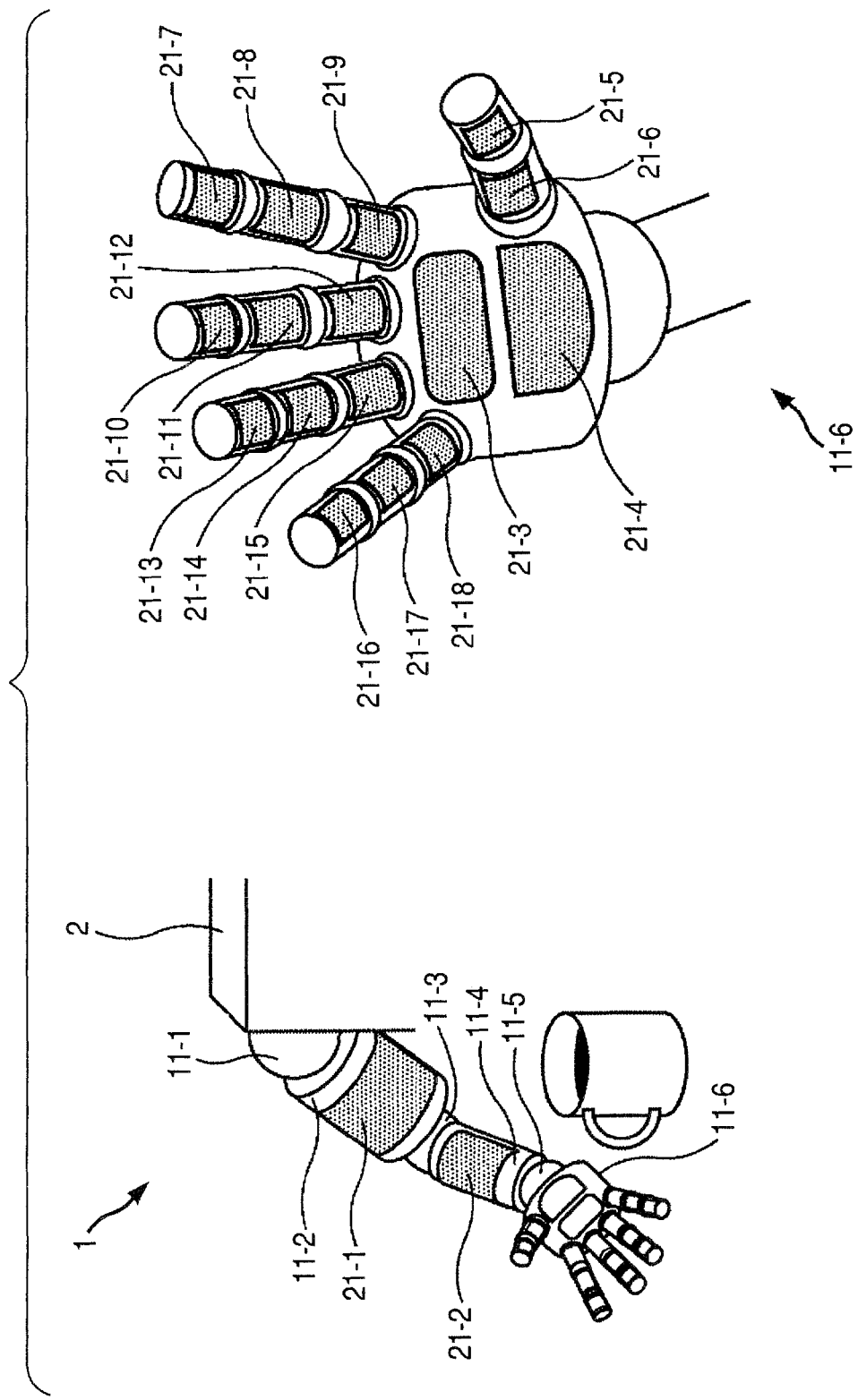
FIG. 1 is a diagram showing an example of the external structure of a robot hand manipulator according to an embodiment of the present invention.

FIG. 1 shows an example of the external structure of a robot hand manipulator according to the embodiment of the present invention.

As shown on the left side in FIG. 1, the robot hand manipulator includes a robot hand 1 and a supporting unit 2 that supports the robot hand 1.

The robot hand 1 includes a shoulder joint section 11-1, an upper arm section 11-2, an elbow joint section 11-3, a forearm section 11-4, a wrist section 11-5, and a hand section 11-6 that are actually-operating sections (these sections are generally referred to as joint section 11 when it is unnecessary to distinguish the sections from one another).

Sensors 21-1 and 21-2 are provided in the upper arm section 11-2 and the forearm section 11-4 of the robot hand 1, respectively. As shown on the right side in FIG. 1 in enlargement, sensors 21-3 and 21-4 are provided in a palm configuring the hand section 11-6 of the robot hand 1. A sensor 21-5 is provided above a first joint on a finger palm surface of a thumb forming the hand section 11-6. A sensor 21-6 is provided between the first joint and a second joint on the finger palm surface of the thumb. A sensor 21-7 is provided above a first joint on a finger palm surface of an index finger. A sensor 21-8 is provided between the first joint and a second joint on the finger palm surface of the index finger. A sensor 21-9 is provided between the second joint and a third joint on the finger palm surface of the index finger.

A sensor 21-10 is provided above a first joint on a finger palm surface of a middle finger. A sensor 21-11 is provided between the first joint and a second joint on the finger palm surface of the middle finger A sensor 21-12 is provided between the second joint and a third joint on the finger palm surface of the middle finger. A sensor 21-13 is provided above a first joint on a finger palm surface of a third finger. A sensor 21-14 is provided between the first joint and a second joint on the finger palm surface of the third finger. A sensor 21-15 is provided between the second joint and a third joint on the finger palm surface of the third finger. A sensor 21-16 is provided above a first joint on a finger palm surface of a little finger. A sensor 21-17 is provided between the first joint and a second joint on the finger palm surface of the little finger. A sensor 21-18 is provided between the second joint and a third joint on the finger palm surface of the little finger.

The sensors 21-1 to 21-18 provided in the robot hand 1 (the sensors are hereinafter simply referred to as sensor 21 when it is unnecessary to specifically distinguish the sensors from one another; the same applies in other cases) include capacitance-type pressure sensors that detect only a normal force (e.g., pressure) perpendicular to surfaces of the sensors. The sensor 21 has on the surface thereof a viscoelastic body having softness like the human skin. The viscoelastic body is deformed into various shapes by a force received from the outside and a form of the force, whereby pressure is dispersed to the sensor 21 on the inside.

The sensor 21 detects, when an object comes into contact with the viscoelastic body, a dispersed pressure value of the object (hereinafter also referred to as distributed pressure value). The sensor 21 detects, on the basis of the detected distributed pressure value, a slip between a gripped object and fingertips, which is gripping information necessary for performing complicated control such as stable gripping and skilful manipulation of an object by the robot hand 1.

The "slip" in gripping and manipulation in this embodiment is defined as described below.

In general, a relative motion between fingers and an object is called a "slip". The relative motion is roughly divided into a "translational motion" and a "rotational motion". The "translational motion" is a motion in a direction orthogonal to a gripping force (a normal force) at a gripping contact point (a shearing direction or a tangent direction). The "rotational motion" is a "rolling motion" of the object rotationally moving while keeping contact with the fingers and a "rotational motion around a normal axis" at the gripping contact point. These motions are distinguished from each other by being referred to as a translational slip and a rotational slip. However, these motions often occur simultaneously in combination.

On the other hand, when stability, robustness, and the like of gripping are taken into account, fingertips desirably have the flexible structure. When an object is gripped by the flexible fingertips, a shearing force is applied to the object. Then, a relative motion gradually occurs from an outer peripheral portion of a contact area and an "initial local slip" in a mixed area of a fixed area and a slipping area occurs. When the shearing force is further applied, after a certain point, the fingertips and the object reach a motion state (a "slip" in a narrow sense) dominated by a coefficient of dynamic friction. At the time of this "initial local slip" equivalent to the start of a slip, since oscillation occurs, it is possible to observe the initial local slip. At a stage before reaching the initial local slip, the contact area of the fingertips and the object is generally unchanged. However, there is also a state in which a flexible material is deformed to cause "shift".

If the gripping and the manipulation are controlled on the basis of only a complete relative motion between the fingers and the object, the gripping and the manipulation is often not satisfactorily be realized because of a delay in the control. Therefore, considering that it is also important to predict a "slip" and prevent the slip, a slip including the "initial local slip" and the "shift" is referred to a "slip" in a broad sense.

The sensor 21 shown in FIG. 1 can detect the "translational motion" and the "rotational motion" including the "initial local slip" and the "shift" in the "slip" defined in this way.

The robot hand manipulator actuates actuators of the respective joint sections making use of softness of the sensor 21 itself, grippability due to friction of the surface, and the like on the basis of a detected slip between a gripped object and the fingertips to thereby grip a mug and move or carry the mug.

As described above, the robot hand manipulator can skillfully grip and manipulate arbitrary objects having various sizes, shapes, surface states, weights, and the like.

Figure 2:
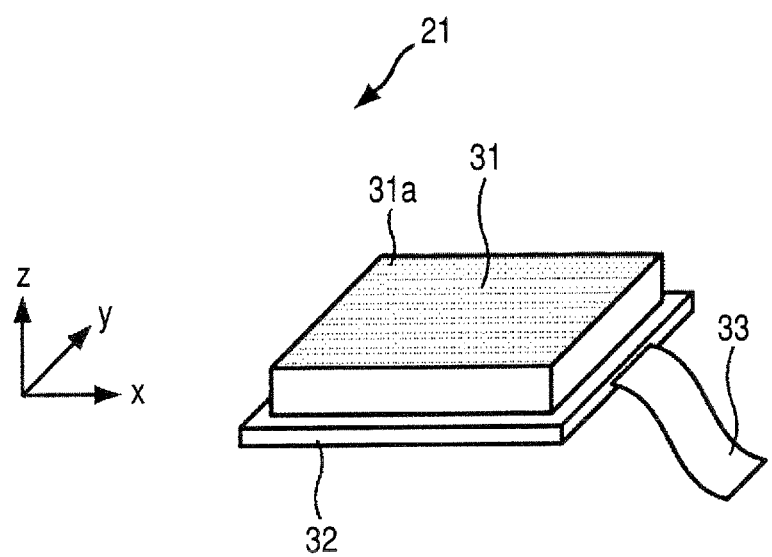
FIG. 2 is a perspective view showing an example of the external structure of a sensor shown in FIG. 1.

FIG. 2 is a perspective view showing an example of the external structure of the sensor 21.

The sensor 21 roughly includes an input section 31 that is a section touched by an object and made of a deformable material, a fixing section 32 that supports the input section 31, and an external connection section 33 through which power is inputted and a detection result of the sensor 21 is outputted to, for example, a main control unit 101 (FIG. 6 described later) of the robot hand manipulator.

In the example in FIG. 2, in the input section 31, an input surface 31a is formed in a square pole shape. In the following explanation, a surface parallel to the input surface 31a is an xy plane of an xyz coordinate system and a direction perpendicular to the input surface 31a is a z axis direction unless specifically noted otherwise.

Figure 3:
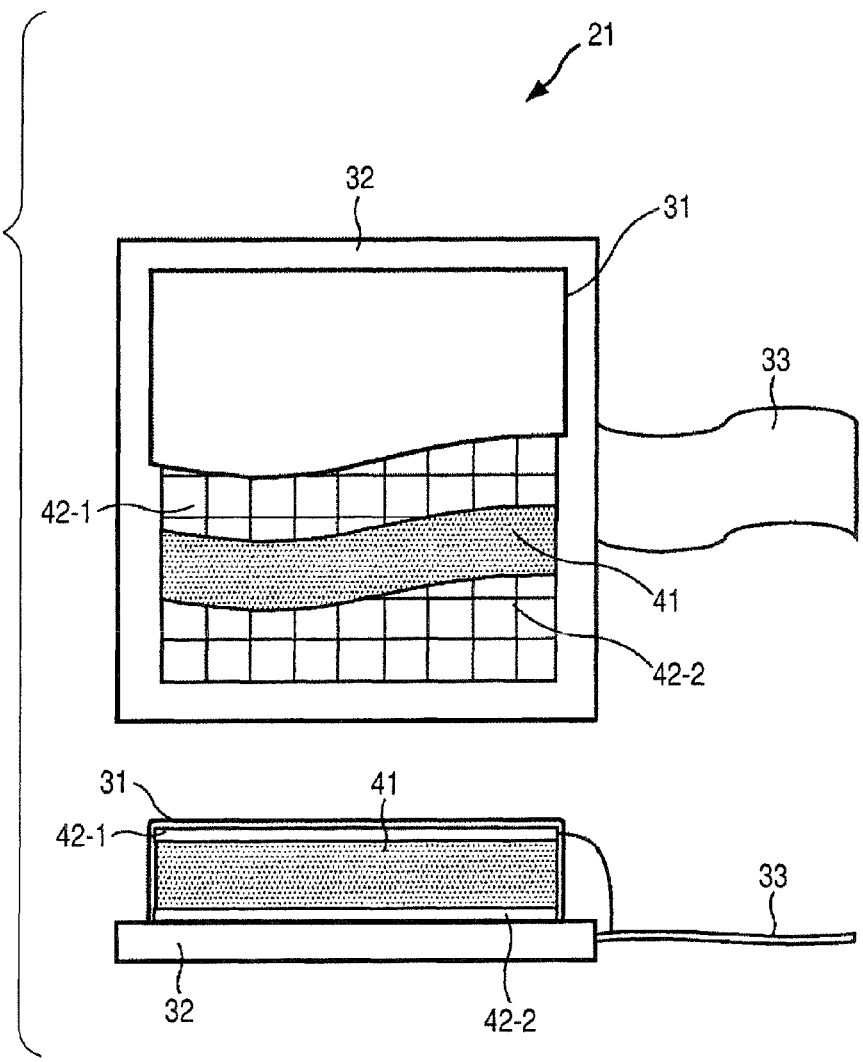
FIG. 3 is a diagram showing an example of the internal structure of the sensor shown in FIG. 2.

FIG. 3 shows the internal structure of the sensor 21 shown in FIG. 2. In the upper part in the figure, a plan view of the sensor 21 viewed from above is shown. In the lower part in the figure, a side sectional view of the sensor 21 is shown.

The input section 31 roughly includes a deforming section 41 and two pressure detecting units 42-1 and 42-2 (these pressure detecting units are referred to as pressure detecting unit 42 when it is unnecessary to distinguish the same from one another). The input section 31 includes a three-layer structure in which the pressure detecting unit 42-1 is a top layer, the deforming section 41 is a middle layer, and the pressure detecting unit 42-2 is a bottom layer. In other words, the input section 31 has a multilayer structure in which the pressure detecting unit 42-1 and the pressure detecting unit 42-2 are arranged to hold the deforming section 41. On an upper side in FIG. 3, the input section 31, the pressure detecting unit 42-1, and the deforming section 41 are shown in a state in which the sections are made transparent stepwise to show the internal structure thereof.

The deforming section 41 is made of a viscoelastic material (a viscoelastic body) having a viscoelastic characteristic such as a silicon gel material. The deforming section 41 can be easily deformed by a load from the outside.

As the viscoelastic material, silicon gel having high heat resistance, low temperature resistance, slidability, and abrasion resistance is suitable. However, other materials can also be used.

A boundary between the input section 31 and the fixing section 32 is formed as a binding surface. The input section 31 and the fixing section 32 are fixed by bonding or integral molding. Therefore, because of incompressibility equivalent to that of a rubber material and the like, for example, a so-called bulging phenomenon in which a part of the sides and the upper surface expands is caused. It is recognized as a result of the experiment by the applicant that a form of the bulging phenomenon shows various characteristics according to a load value and an input surface shape.

Figure 4:
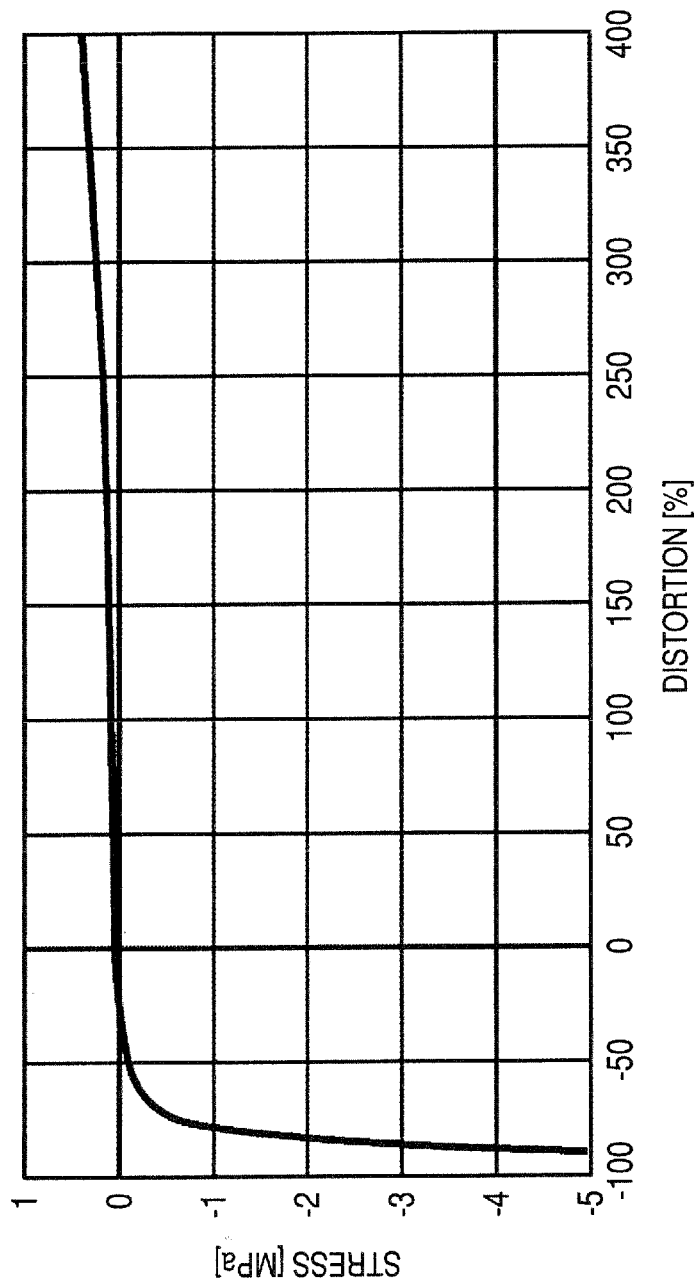
FIG. 4 is a graph showing an example of compression and tension characteristics of a viscoelastic material.

FIG. 4 is a graph showing an example of compression and tension characteristics of the viscoelastic material used in the deforming section 41.

The ordinate represents a stress [Mpa] generated against a load (an external force) acting on the viscoelastic material. The abscissa represents distortion (%), which is a degree of deformation due to the load on the material with respect to an original state.

In this example, when a load of compression is applied in a state in which distortion does not occur (i.e., distortion is 0%), the distortion changes to about −90 and the stress increases little by little in a minus direction (downward in the figure) until the distortion reaches about −50. When the distortion exceeds about −60, the stress suddenly increases.

On the other hand, when a load of tension is applied when the distortion is 0, the distortion changes to 400% and, during the change, the stress gently increases in a plus direction (upward in the figure) compared with the increase in the stress in the case of compression. In the case of this example, distortion equal to or larger than 400% is not measured. However, it is considered that the distortion changes to a certain degree exceeding 400% and the stress increases in the same manner.

Referring back to FIG. 3, the pressure detecting unit 42 includes, for example, a capacitance-type pressure sensor that detects pressure using a capacitance change.

Stress relaxation and stress dispersion are caused by the deformation of the deforming section 41 and pressure is dispersed to the pressure detecting unit 42 on the inside. Therefore, the pressure detecting unit 42 can obtain sensing performance equal to or higher than spatial resolution of the capacitance-type pressure sensor on the basis of an interpolation characteristic due to the deformation of the viscoelastic body.

Figure 5:
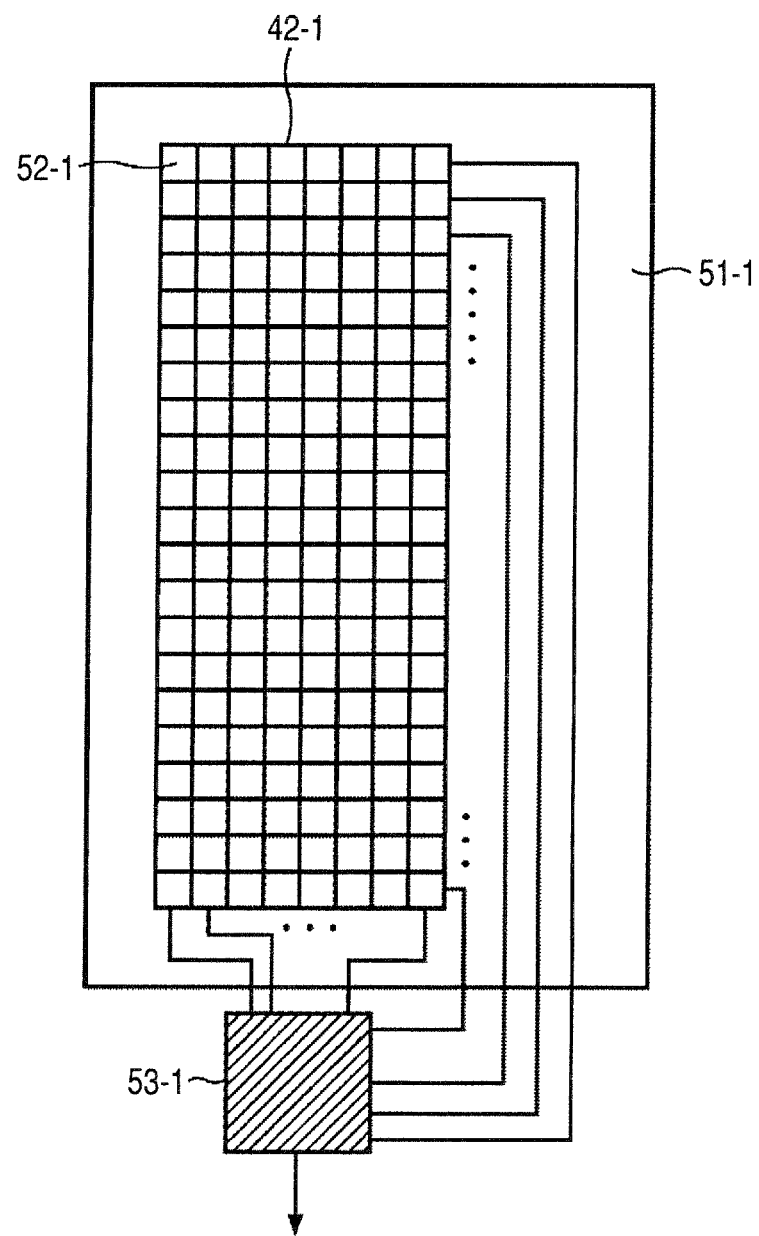
FIG. 5 is a diagram showing an example of the structure of a capacitance-type pressure sensor configuring a pressure detecting unit shown in FIG. 2.

FIG. 5 shows details of the pressure detecting unit 42-1 shown in FIG. 3.

The pressure detecting unit 42-1 includes, for example, plural pressure detection elements (hereinafter also referred to as sensor elements) 52-1 arranged in a matrix shape on a flexible substrate 51-1. In other words, a sensor configured by the pressure detecting unit 42-1 is a capacitance-type pressure sensor and is also called a distributed pressure sensor. In an example in FIG. 5, for convenience of explanation, one sensor element is denoted by a reference numeral and reference numerals of the other sensor elements are omitted.

In the case of the example in FIG. 5, the pressure detecting unit 42-1 includes one-hundred sixty-eight sensor elements 52-1 arranged in vertical 21 columns×horizontal 8 rows. Lead-out lines are inputted to a signal processing unit 53-1 from the respective columns and the respective rows of the sensor elements 52-1. Distributed pressure values detected by the respective sensor elements 52-1 are inputted to the signal processing unit 53-1 via the lead-out lines and subjected to predetermined signal processing by the signal processing unit 53-1. A result of the signal processing is outputted to the outside of the sensor 21.

The pressure detecting unit 42-1 is configured as described above. The pressure detecting unit 42-1 is explained above. Since the pressure detecting unit 42-2 is basically configured the same as the pressure detecting unit 42-1, illustration and explanation of the pressure detecting unit 42-2 are omitted. A flexible substrate, a sensor element, and a signal processing unit in the pressure detecting unit 42-2 corresponding to the flexible substrate 51-1, the sensor element 52-1, and the signal processing unit 53-1 in the pressure detecting unit 42-1 are referred to as flexible substrate 51-2, sensor element 52-2, and signal processing unit 53-2, respectively.

The pressure detecting unit 42-1 and the pressure detecting unit 42-2 are configured as described above. Therefore, precisely, the sensor 21 is configured by arranging, in a three-layer structure, the flexible substrate 51-1 on which the pressure detecting unit 42-1 and the signal processing unit 53-1 are arranged, the deforming section 41, and the flexible substrate 51-2 on which the pressure detecting unit 42-2 and the signal processing unit 53-2 are arranged.

Figure 6:
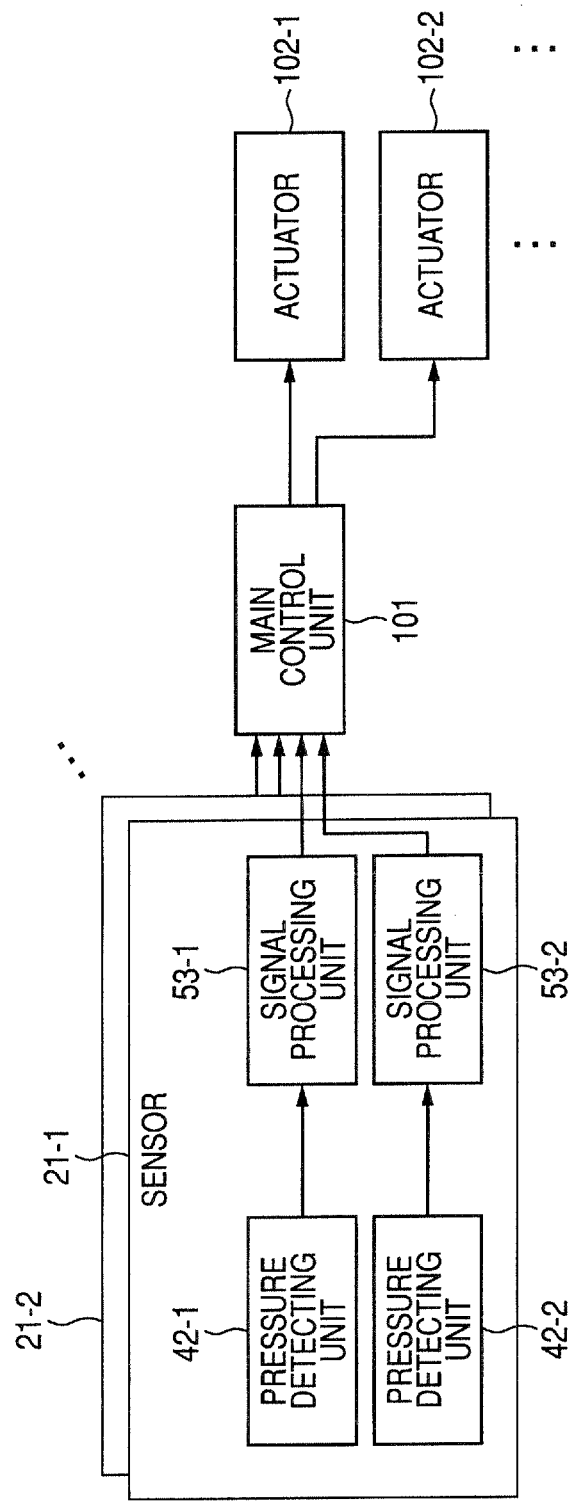
FIG. 6 is a block diagram showing an example of the internal electric structure of the robot hand manipulator.

FIG. 6 shows an example of the electric structure of the robot hand manipulator shown in FIG. 1.

In the example in FIG. 6, the robot hand manipulator includes a main control unit 101, actuators 102-1, 102-2, and the like, and sensors 21-1, 21-2, and the like.

The sensors 21 arranged in predetermined positions corresponding to predetermined joint sections 11 as shown in FIG. 1 electrically include the pressure detecting units 42-1, the signal processing units 53-1, the pressure detecting units 42-2, and the signal processing units 53-2 as explained with reference to FIG. 5.

The pressure detecting units 42-1 at the top layers of the sensors 21 output distributed pressure values, which are detected by the plural sensor elements 52-1 using a capacitance change as a detection principle, to the signal processing units 53-1. The pressure detecting units 42-2 at the bottom layer of the sensors 21 output distributed pressure values, which are detected by the plural sensor elements 52-2 using a capacitance change as a detection principle, to the signal processing units 53-2. The detection principle for a distributed pressure value may be other than the capacitance change. For example, the detection principle may be a resistance value change or, if a distributed pressure value can be obtained, a sensor configured by simply arranging pressure sensitive rubber may be used.

The signal processing units 53-1 and the signal processing units 53-2 of the sensors 21 perform predetermined kinds of signal processing (described later), respectively, using the distributed pressure values from the pressure detecting units 42-1 and the pressure detecting units 42-2 to thereby detect a slip between a gripped object and the fingertips and output information on the detected slip to the main control unit 101 on a real time basis.

The main control unit 101 incorporates a CPU (Central Processing Unit), a memory, and the like. Control programs stored in the memory are executed by the CPU, whereby the main control unit 101 performs various kinds of processing.

For example, the main control unit 101 receives the information on the slip between the gripped object and the fingertips detected by the sensors 21. The main control unit 101 controls necessary ones among the actuators 102 using softness of the sensors 21 themselves, grippability by friction of the surfaces, and the like on the basis of information on a slip between the gripped object and the fingertips from the sensors 21 to drive the predetermined joint sections 11, cause the robot hand 1 to grip the object and, for example, move or carry the object.

The actuators 102 are incorporated in the predetermined joint sections 11 (i.e., the shoulder joint section 11-1, the elbow joint section 11-3, the wrist section 11-5, and the hand section 11-6) of the robot hand 1, respectively, and drive the predetermined joint sections 11 according to a driving signal from the main control unit 101. Consequently, the predetermined joint sections 11 can rotate with predetermined degrees of freedom.

Figure 7:
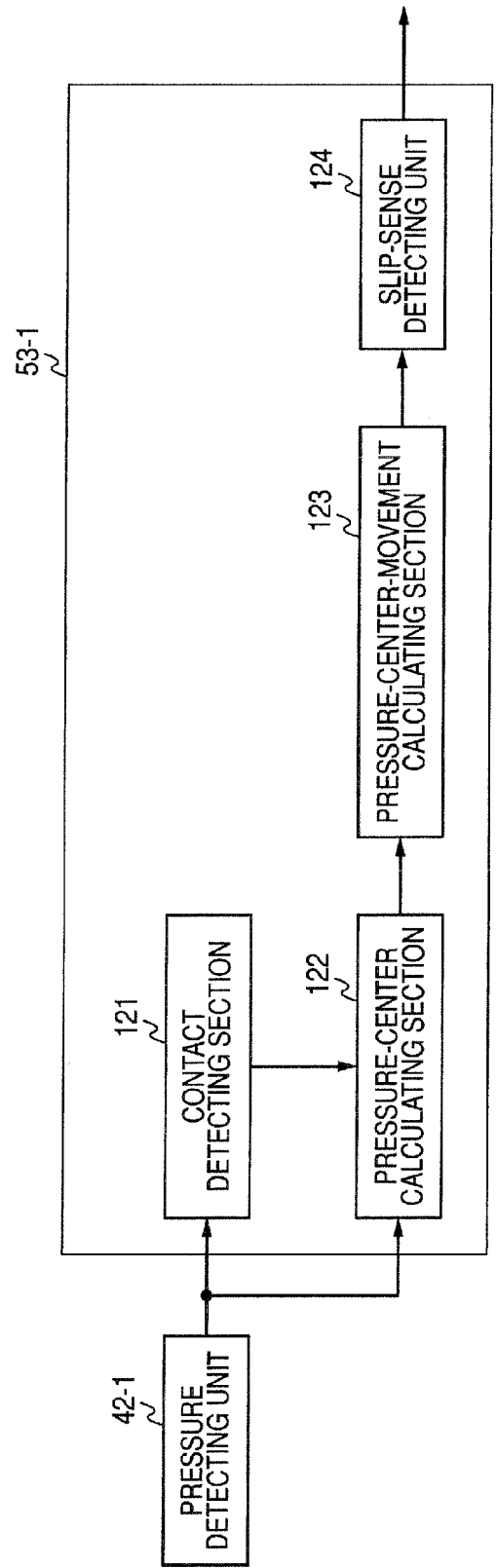
FIG. 7 is a block diagram showing an example of the structure of a signal processing unit shown in FIG. 6.

FIG. 7 shows an example of the electric structure of the signal processing unit 53-1 of the sensor 21. Information on a distributed pressure value from the pressure detecting unit 42-1 is inputted to a contact detecting section 121 and a pressure-center calculating section 122 of the signal processing unit 53-1.

The contact detecting section 121 performs contact detection in the sensor elements 52-1 using the distributed pressure value from the pressure detecting unit 42-1 and outputs information on the sensor elements 52-1, in which detection of contact of an object with the sensor 21 (the deforming section 41) is performed, to the pressure-center calculating section 122.

For example, it is assumed that, when the pressure detecting unit 42-1 includes m×n (in the case of the example in FIG. 5, considering that the length is the horizontal direction, m=21 and n=8) sensor elements 52-1; m (x=0, 1, 2, ..., m−1) in the horizontal direction (x) and n (y=0, 1, 2, ..., n−1) in the vertical direction (y). When outputs (i.e., pressure values) P(x, y) of the respective sensor elements 52-1 exceed a certain threshold th(x, y), i.e., the following formula (1) is satisfied, the contact detecting section 121 judges that the sensor elements 52-1 detect contact of the object with the input section 31 (the deforming section 41). The threshold th(x, y) may be the same for all the sensor elements 52-1.

$$P(x,y) > th(x,y) \qquad (1)$$

When a sum of outputs P(x, y) of the respective sensor elements 52-1 exceeds a certain threshold th, i.e., when the following formula (2) is satisfied, the contact detecting section 121 may judge that the sensor elements 52 detect contact.

$$\sum_{y=0}^{n-1}\sum_{x=0}^{m-1} P(x, y) > th \qquad (2)$$

The pressure-center calculating section 122 calculates a pressure center position using the distributed pressure value from the pressure detecting unit 42-1 and supplies the pressure center position to a pressure-center-movement calculating section 123.

Specifically, when pressure values detected by the sensor elements 52-1 of the pressure detecting unit 42-1 is represented as P(x, y) and unit areas of the respective sensor elements 52-1 are represented as S(x, y), pressure center positions COPx and COPy are calculated by the following formula (3):

$$COPx = \frac{\sum_{y=0}^{n-1}\sum_{x=0}^{m-1} P(x, y) \times S(x, y) \times x}{\sum_{y=0}^{n-1}\sum_{x=0}^{m-1} P(x, y) \times S(x, y)} \qquad (3)$$

$$COPy = \frac{\sum_{y=0}^{n-1}\sum_{x=0}^{m-1} P(x, y) \times S(x, y) \times y}{\sum_{y=0}^{n-1}\sum_{x=0}^{m-1} P(x, y) \times S(x, y)}.$$

A denominator on the right side of formula (3) is a sum of forces applied in a tangent direction and a numerator on the right side is a sum of torques. Therefore, according to formula (3), a pressure center position is calculated as a representative point of positions to which the torques are applied.

As in the case of the example in FIG. 5, when all the unit areas S(x, y) of the sensor elements 52-1 are the same, the pressure center positions COPx and COPy can be simply calculated by the following formula (4):

$$COPx = \frac{\sum_{y=0}^{n-1}\sum_{x=0}^{m-1} P(x, y) \times x}{\sum_{y=0}^{n-1}\sum_{x=0}^{m-1} P(x, y)} \qquad (4)$$

$$COPy = \frac{\sum_{y=0}^{n-1}\sum_{x=0}^{m-1} P(x, y) \times y}{\sum_{y=0}^{n-1}\sum_{x=0}^{m-1} P(x, y)}.$$

In formula (3) and formula (4), the pressure values P(x, y) of all the sensor elements 52-1 are used. However, the pressure center positions COPx and COPy can also be calculated by using only the pressure values P(x, y) of the sensor elements 52-1 that satisfy formula (1) or formula (2), i.e., detect contact. In this case, when contact is not detected, since a pressure center position is not calculated, the calculation can be stopped.

In the case of the example in FIG. 5, the sensor elements 52-1 are arranged in the horizontal direction and the vertical direction, respectively. However, the sensor elements 52-1 can perform the same processing when the sensor elements 52-1 are arranged only in the horizontal direction or the vertical direction. When the sensor element 52-1 is arranged only in the horizontal direction, n is 0 and only a result of the pressure center position COPx is used. When the sensor elements 52-1 are arranged only in the vertical direction, m is 0 and only a result of the pressure center position COPy is used.

The pressure center positions COPx and COPy calculated as described above take only values of $0 \geq COPx \geq m-1$ and $0 \geq COPy \geq n-1$ according to a pressure value. Therefore, it is possible to use a detection result of contact position detection in the pressure-center-movement calculating section 123 by passing the pressure center positions COPx and COPy to the pressure-center-movement calculating section 123.

The pressure-center-movement calculating section 123 accumulates, in time series, pressure center positions passed from the pressure-center calculating section 122. The pressure-center-movement calculating section 123 calculates, for example, a difference of a moving average value of the accumulated pressure center positions or a difference of the pressure center positions and outputs the calculated difference to a slip-sense detecting section 124.

For example, respective kinds of time series information of pressure center positions are represented as COPx(t) and COPy(t). In order to absorb very small fluctuation, the pressure-center-movement calculating section 123 applies low-pass filtering or moving averaging to COPx(t) and COPy(t). In the following explanation, simpler moving averaging is used in a calculation. When fluctuation (noise) is small, low-pass filtering or moving averaging processing does not have to be performed.

When numbers to be moving averaged is represented as M, moving averages $COPx_{MA}(t)$ and $COPy_{MA}(t)$ are represented by the following formula (5) by using COPx(t) and COPy(t) accumulated in time series:

$$COPx_{MA}(t) = \frac{1}{M}\sum_{i=0}^{M-1} COPx(t-i) \quad (5)$$

$$COPy_{MA}(t) = \frac{1}{M}\sum_{i=0}^{M-1} COPy(t-i).$$

The pressure-center-movement calculating section 123 accumulates the calculated moving averages $COPx_{MA}(t)$ and $COPy_{MA}(t)$ in time series as well. The pressure-center-movement calculating section 123 calculates a pressure center movement calculated value as indicated by the following formula (6) using the accumulated moving average values.

$$Dx(t,i) = COPx_{MA}(t) - COPx_{MA}(t-1)$$

$$Dy(t,i) = COPy_{MA}(t) - COPy_{MA}(t-1) \quad (6)$$

In formula (6), for example, differences between a moving average value at time t and moving average values at time t−1, time t−2, and time t−3 are calculated. In other words, changes in time in plural number of times are calculated. Pressure center movement calculated values Dx(t, i) and Dy(t, i), which are the differences of the moving average values, are outputted to the slip-sense detecting section 124.

The slip-sense detecting section 124 performs, for example, a pressure center movement detecting calculation using a calculation result (i.e., the pressure center movement calculated values) from the pressure-center-movement calculating section 123 and detects a slip according to a calculation result of the pressure center movement detecting calculation. The slip-sense detecting section 124 also detects a slip using the calculation result from the pressure-center-movement calculating section 123. When the calculation result of the pressure center movement detecting calculation is used, the slip-sense detecting section 124 multiplies the pressure center movement calculated value with coefficients corresponding to levels of the pressure center movement calculated values to perform the pressure center movement detecting calculation. The slip-sense detecting section 124 detects a slip according to a calculation result of the pressure center movement detecting calculation.

In other words, the slip-sense detecting section 124 judges whether the calculation result of the pressure center movement detecting calculation or the calculation result from the pressure-center-movement calculating section 123 exceeds a predetermined threshold (hereinafter referred to as threshold for judgment) and, when it is judged that the calculation result exceeds the threshold for judgment, detects a slip.

For example, the slip-sense detecting section 124 performs a calculation of formula (7) using the pressure center movement calculated values Dx(t, i) and Dy(t, i) from the pressure-center-movement calculating section 123 and calculates movement detection coefficients Kx(i) and Ky(i).

$$Kx(i) = \begin{cases} Cs: |Dx(t,i)| < \text{threshold} \cdot i \\ Cl: |Dx(t,i)| \geq \text{threshold} \cdot i \end{cases} \quad (7)$$

$$Ky(i) = \begin{cases} Cs: |Dy(t,i)| < \text{threshold} \cdot i \\ Cl: |Dy(t,i)| \geq \text{threshold} \cdot i \end{cases}$$

where, threshold is a fixed value and Cs and Cl are constants having a relation 0<Cs<Cl. For example, Cs=1 and Cl=2 are used. Therefore, threshold·i is a value that increases as "i" increases. In other words, the movement detection coefficients Kx(i) and Ky(i) are coefficients that are calculated according to levels of the pressure center movement calculated values Dx(t, i) and Dy(t, i). More specifically, the movement detection coefficients Kx(i) and Ky(i) are coefficients that are calculated according to a result of comparison of the levels of the pressure center movement calculated values Dx(t, i) and Dy(t, i) and the value that increases as time elapses. Note that threshold may be a variable value.

The slip-sense detecting section 124 performs a pressure center movement detecting calculation using values calculated by formula (6) and formula (7). An arithmetic expression of the pressure center movement detecting calculation is represented by formula (8).

$$Mdx(t,i) = Kx(i) \cdot Dx(t,i)$$

$$Mdy(t,i) = Ky(i) \cdot Dy(t,i) \quad (8)$$

Moreover, the slip-sense detecting section 124 performs a slip sense detecting calculation using a value calculated by formula (8). An arithmetic expression of the slip sense detecting calculation is represented by formula (9).

$$Sdx(t) = \sum_{i=1}^{N} Mdx(t,i) \quad (9)$$

$$Sdy(t) = \sum_{i=1}^{N} Mdy(t, i)$$

Slip sense detection values Sdx and Sdy calculated by formula (9) are amounts having a characteristic that the amounts increase as a slip amount increases and a direction component thereof is substantially saved. When the slip-sense detecting section 124 judges that the slip sense detection values Sdx and Sdy exceed the threshold for judgment, the slip-sense detecting section 124 detects a slip.

By setting a value of N in formula (9) large and setting threshold in formula (7) small, it is possible to detect a slip even when an object slips very slowly. By setting a value of N small and setting threshold large, it is possible to detect only a slip when the object slips fast. Therefore, the slip-sense detecting section 124 can acquire plural kinds of slip sense detection values Sdx and Sdy by applying the calculation to plural N's and plural thresholds and can use the slip sense detection values Sdx and Sdy properly according to a purpose of detection.

The slip detected by the slip-sense detecting section 124 as described above and a direction of the slip are outputted to the main control unit 101 as information on the slip on a real time basis. Consequently, the main control unit 101 can accurately control an object gripping operation of the robot hand 1.

The pressure center movement calculated values $Dx(t, i)$ and $Dy(t, i)$ described above are not only calculated by formula (6). For example, when fluctuation is small, the pressure center movement calculated value $Dx(t, i)$ and $Dy(t, i)$ can also be calculated by the following formula (10) by using $COPx(t)$ and $COPy(t)$ accumulated in time series.

$$Dx(t,i)=COPx(t)-COPx(t-1)$$

$$Dy(t,i)=COPy(t)-COPy(t-1) \quad (10)$$

The slip sense detection values Sdx and Sdy described above are not only calculated by formula (9). The slip sense detection values Sdx and Sdy can also be calculated as described below.

For example, when fluctuation is extremely small, the slip sense detection values Sdx and Sdy are calculated by setting "i" of $Dx(t, i)$ and $Dy(t, i)$ to 1, respectively. In other words, the slip sense detection values Sdx and Sdy are represented by the following formula (11):

$$Sdx(t)=Mdx(t,1)=COPx(t)-COPx(t-1)$$

$$Sdy(t)=Mdy(t,1)=COPy(t)-COPy(t-1) \quad (11)$$

In this case, a slow slip and a fast slip can be detected by comparing the slip sense detection values Sdx and Sdy with plural thresholds for judgment. For example, a slow slip can be detected by comparing the slip sense detection values Sdx and Sdy with a small threshold for judgment and a high slip can be detected by comparing the slip sense detection values Sdx and Sdy with a large threshold for judgment.

Moreover, when fluctuation is small but is not so small as described above, the slip sense detection values Sdx and Sdy can be calculated by setting "i" of $Dx(t, i)$ and $Dy(t, i)$ to N, respectively. In this case, the slip sense detection values Sdx and Sdy are represented by the following formula (12).

$$Sdx(t)=Mdx(t,N)=COPx(t)-COPx(t-N)$$

$$Sdy(t)=Mdy(t,N)=COPy(t)-COPy(t-N) \quad (12)$$

In this case, as in the above case, an extremely slow slip and an extremely fast slip can also be detected by comparing the slip sense detection values Sdx and Sdy with plural N's and plural thresholds for judgment. In other words, a slow slip can be detected by setting N's large and setting the thresholds for judgment small and a fast slip can be detected by setting N's small and setting the thresholds for judgment large.

The same holds true when a moving average of pressure center positions is calculated. The slip sense detection values Sdx and Sdy at the time when the moving average is calculated can be calculated by setting "i" of $Dx(t, i)$ and $Dy(t, i)$ to 1, respectively, and can also be calculated by setting "i" of $Dx(t, i)$ and $Dy(t, i)$ to N, respectively. In other words, the slip sense detection values Sdx and Sdy calculated by setting "i" of $Dx(t, i)$ and $Dy(t, i)$ at the time when the moving average is calculated to 1 are represented by the following formula (13) and the slip sense detection values Sdx and Sdy calculated by setting "i" of $Dx(t, i)$ and $Dy(t, i)$ at the time when the moving average is calculated to N are represented by the following formula (14):

$$Sdx(t)=Mdx(t,1)=COPx_{MA}(t)-COPx_{MA}(t-1)$$

$$Sdy(t)=Mdy(t,1)=COPy_{MA}(t)-COPy_{MA}(t-1) \quad (13)$$

$$Sdx(t)=Mdx(t,N)=COPx_{MA}(t)-COPx_{MA}(t-N)$$

$$Sdy(t)=Mdy(t,N)=COPy_{MA}(t)-COPy_{MA}(t-N) \quad (14)$$

In the former case (i.e., when the slip sense detection values Sdx and Sdy are calculated by setting "i" of $Dx(t, i)$ and $Dy(t, i)$ at the time when the moving average is calculated to 1), as in the above case, a slow slip and a fast slip can be detected by comparing the slip sense detection values Sdx and Sdy with plural thresholds for judgment. For example, a slow slip can be detected by comparing the slip sense detection values Sdx and Sdy with a small threshold for judgment and a fast slip can be detected by comparing the slip sense detection values Sdx and Sdy with a large threshold for judgment.

In the latter case (i.e., when the slip sense detection values Sdx and Sdy are calculated by setting "i" of $Dx(t, i)$ and $Dy(t, i)$ at the time when the moving average is calculated to N), as in the above case, an extremely slow slip and an extremely fast slip can be detected by comparing the slip sense detection values Sdx and Sdy with plural N's and plural thresholds for judgment. In other words, a slow slip can be detected by setting N's large and setting the thresholds for judgment small and a fast slip can be detected by setting N's small and setting the thresholds for judgment large.

The signal processing unit 53-1 is configured as described above and calculates a slip sense detection values from a pressure received by the upper layer portion of the sensor 21. The signal processing unit 53-2 is basically configured the same as the signal processing unit 53-1. Therefore, illustration and explanation of the signal processing unit 53-2 are omitted. However, the signal processing unit 53-2 calculates a slip sense detection value from a pressure received by the lower layer portion of the sensor 21.

Operations of the sensor 21 are explained below.

Figure 8:
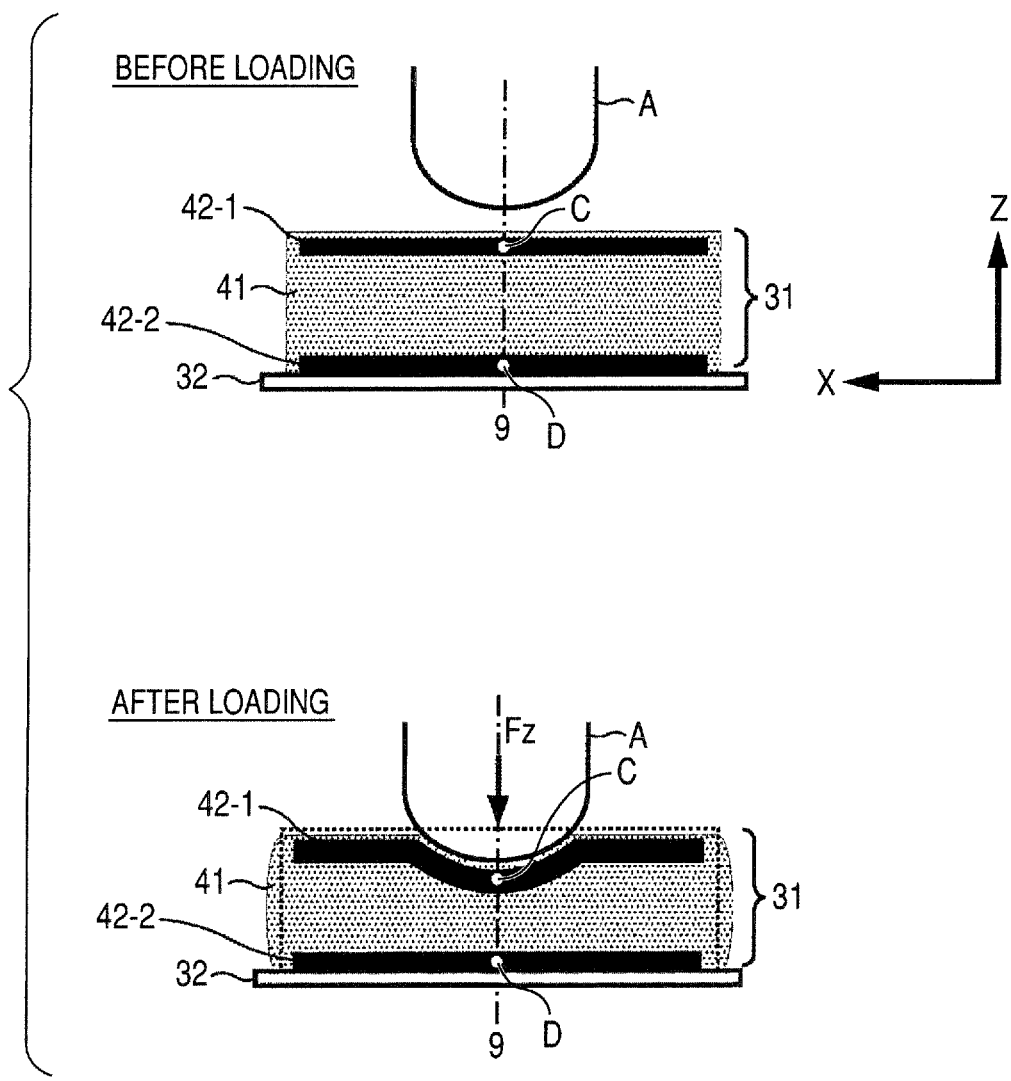
FIG. 8 is a diagram showing an example of shapes of an input section before loading and after loading.

FIG. 8 shows an example of a shape of the input section 31 before loading (on an upper side of the figure) and an example of a shape of the input section 31 after loading (on a lower side of the figure). In the examples in FIG. 8, a left direction in the figure represents a plus direction of an x axis of an xyz coordinate system and an upward direction in the figure represents a plus direction of a z axis of the xyz coordinate system.

A pressure tip A is depressed to a predetermined position (in the example in FIG. 8, a position of a graduation 9) on the x axis of the input section 31. A load Fz in a minus direction (a downward direction in the figure) of the z axis is applied to the position of the input section 31.

When the load Fz in the minus direction of the z axis is applied to the input section 31 in this way, the deforming section 41 is gradually deformed because the input section 31 and the fixing section 32 are fastened by bonding or integral molding, a boundary between the input section 31 and the fixing section 32 is formed as a binding surface, and the deforming section 41 has incompressibility equivalent to that of a rubber material. A pressure distribution occurs because of stress dispersion (synonymous with stress relaxation). After loading, a so-called bulging phenomenon in which a part of the sides and the upper surface expands more than an original shape indicated by a dotted line is caused. A pressure distribution in that state occurs.

Figure 9:
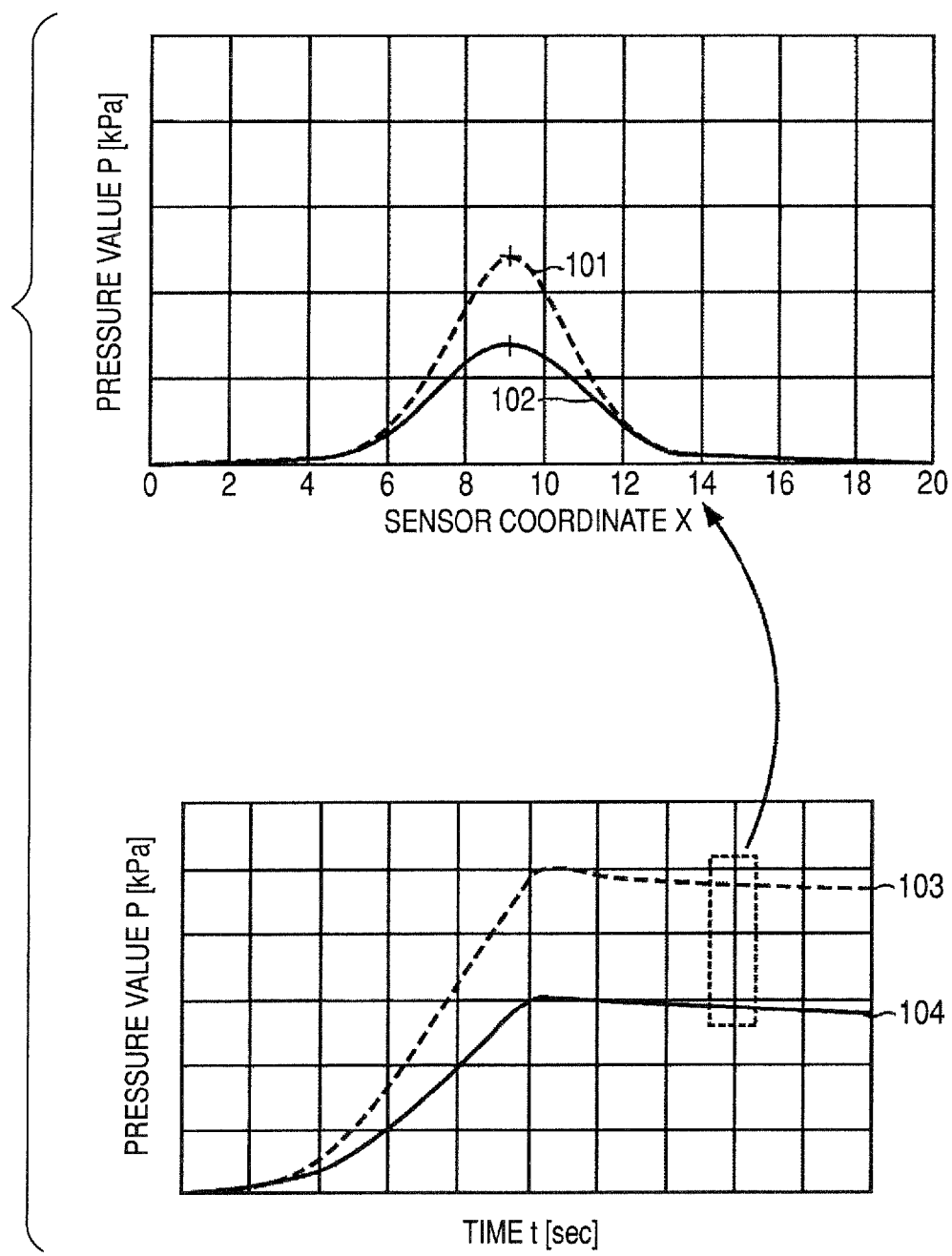
FIG. 9 is a diagram showing a graph of a pressure value and time and a graph of a pressure value and a position in the case of FIG. 8.

When attention is paid to this pressure distribution, a pressure value measured by the sensor element 52-1 located in a pressure center position C by the load Fz among the sensor elements 52-1 configuring the pressure detecting unit 42-1 gradually increases as indicated by a curve 103 of a graph of a pressure value and time shown in FIG. 9 (a graph in a lower part of FIG. 9). When the pressure value reaches a predetermined value, the pressure value comes into a statically determinate state in which the predetermined value is maintained.

A pressure value measured by the sensor element 52-2 located in a pressure center position D by the load Fz among the sensor elements 52-2 configuring the pressure detecting units 42-2 also gradually increases as indicated by a curve 104 of the graph of a pressure value and time shown in FIG. 9 (the graph in the lower part of FIG. 9). When the pressure value reaches a predetermine value, the pressure value comes into a statically determinate state in which the predetermined value is maintained.

A distribution of pressure values in the pressure detecting unit 42-1 in the statically determinate state has a substantially symmetrical curved shape with the pressure value in the pressure center position C (around the graduation 9) set as the maximum and pressure values at both ends of a distribution range of the pressure values set as the minimum as indicated by a curve 101 of a graph of a pressure value and a position in the x axis direction shown in FIG. 9 (a graph in an upper part of FIG. 9).

A distribution of pressure values in the pressure detecting unit 42-2 in the statically determinate state also has a substantially symmetrical curved shape with the pressure value in the pressure center position D (around the graduation 9) set as the maximum and pressure values at both ends of a distribution range of the pressure values set as the minimum as indicated by a curve 102 of the graph of a pressure value and a position in the x axis direction shown in FIG. 9 (the graph in the upper part of FIG. 9).

The pressure value detected by the pressure detecting unit 42-1 is larger than the pressure value detected by the pressure detecting unit 42-2 because, whereas the pressure detecting unit 42-1 is substantially directly pushed by the pressure tip A, pressure by the pressure tip A is indirectly transmitted to the pressure detecting unit 42-2 via the deforming section 41. Times until the pressure values come into the statically determinate state are different because of a difference in pressure propagation speed depending on whether the pressure is transmitted via the deforming section 41.

When there is no viscoelasticity below or above the pressure detecting unit 42, the pressure detecting unit 42 comes into a state of substantial point-contact with the tip A and only a pressure value of the sensor element 52 located in the pressure center position C or the pressure center position D is detected. Therefore, the pressure distribution of the graph of a pressure value and a position in the x axis direction shown in FIG. 9 is not generated.

In this way, the deforming section 41 is deformed according to a load and a pressure value corresponding to the deformation is detected by the pressure detecting unit 42. Since the deforming section 41 made of a viscoelastic body is provided below or above the pressure detecting unit 42, a pressure distribution equal to or larger than a contact area of a contact object (the pressure tip A) is generated. Therefore, the pressure distribution is in a wide range and noise in a pressure center calculation result is reduced.

Figure 10:
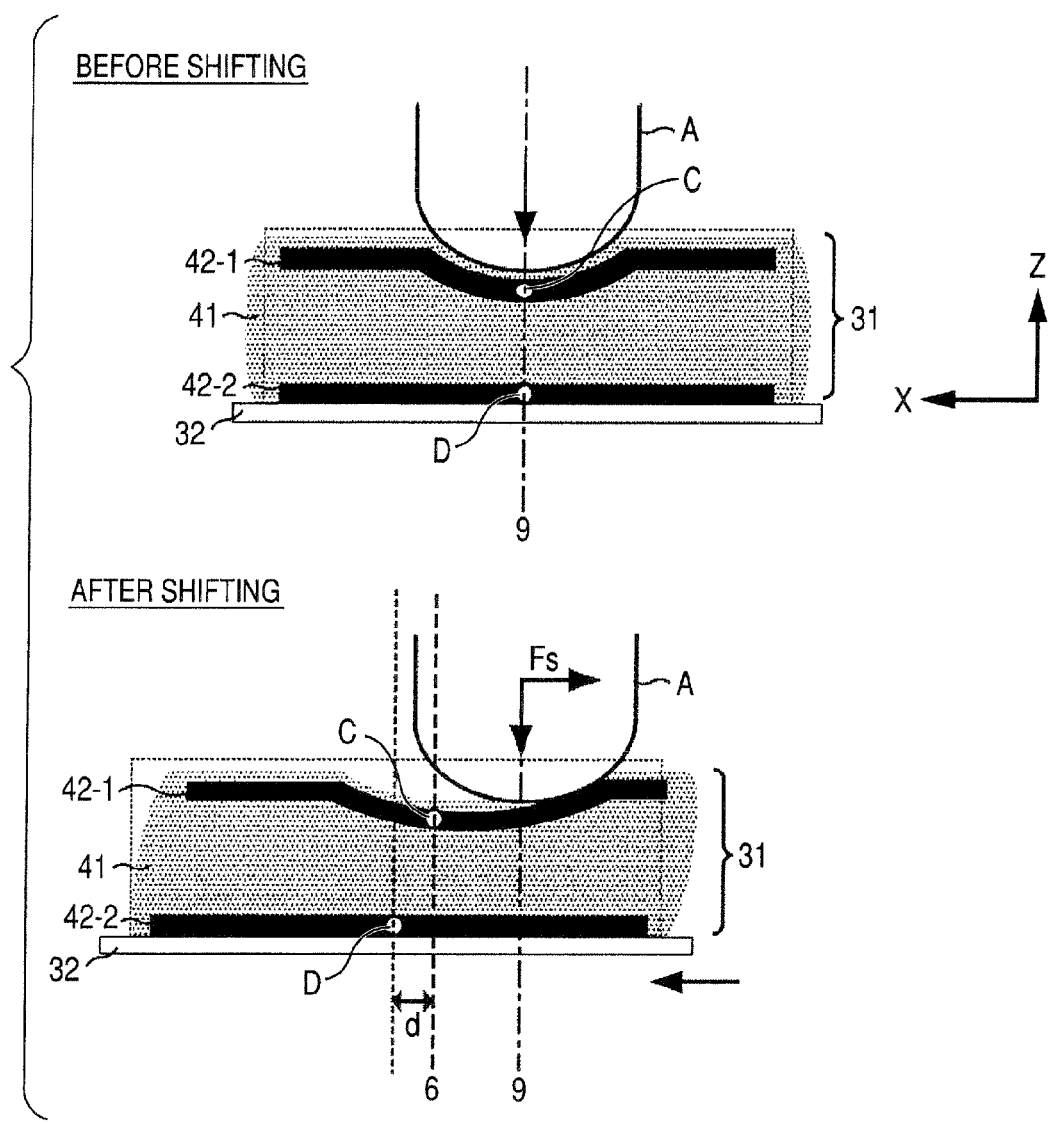
FIG. 10 is a diagram showing an example of shapes of the input section before shifting and after shifting.

FIG. 10 shows an example of a shape of the input section 31 before shifting (on an upper side of the figure) and an example of a shape of the input section 31 after shifting (on a lower side of the figure). A state of the input section 31 before shifting shown in FIG. 10 represents a state same as the state of the input section 31 after loading shown in FIG. 8 (on the lower side of FIG. 8).

In FIG. 10, as indicated by the state before shifting, the load Fz in the minus direction (the downward direction in the figure) of the z axis is applied to the input section 31 by the depression of the input section 31 by the pressure tip A. Then, as indicated by the state after shifting, while the pressure tip A keeps on depressing the input section 31, a shifting operation for shifting the pressure tip A in the minus direction (the right direction in the figure) of the x axis is performed by a shearing force Fs. In the example in FIG. 10, a position of the pressure tip A is fixed and the entire sensor 21 moves in the left direction in the figure while maintaining positions on the y axis and the z axis, whereby the shifting operation is performed.

The input section 31 is shear-deformed by the shifting operation in the minus direction of the x axis while keeping the binding surface with the fixing section 32 fastened. As a result, a pressure distribution positional relation with respect to the sensor elements 52 located in the pressure center positions C and D by the load Fz before shifting is changed.

Figure 11:
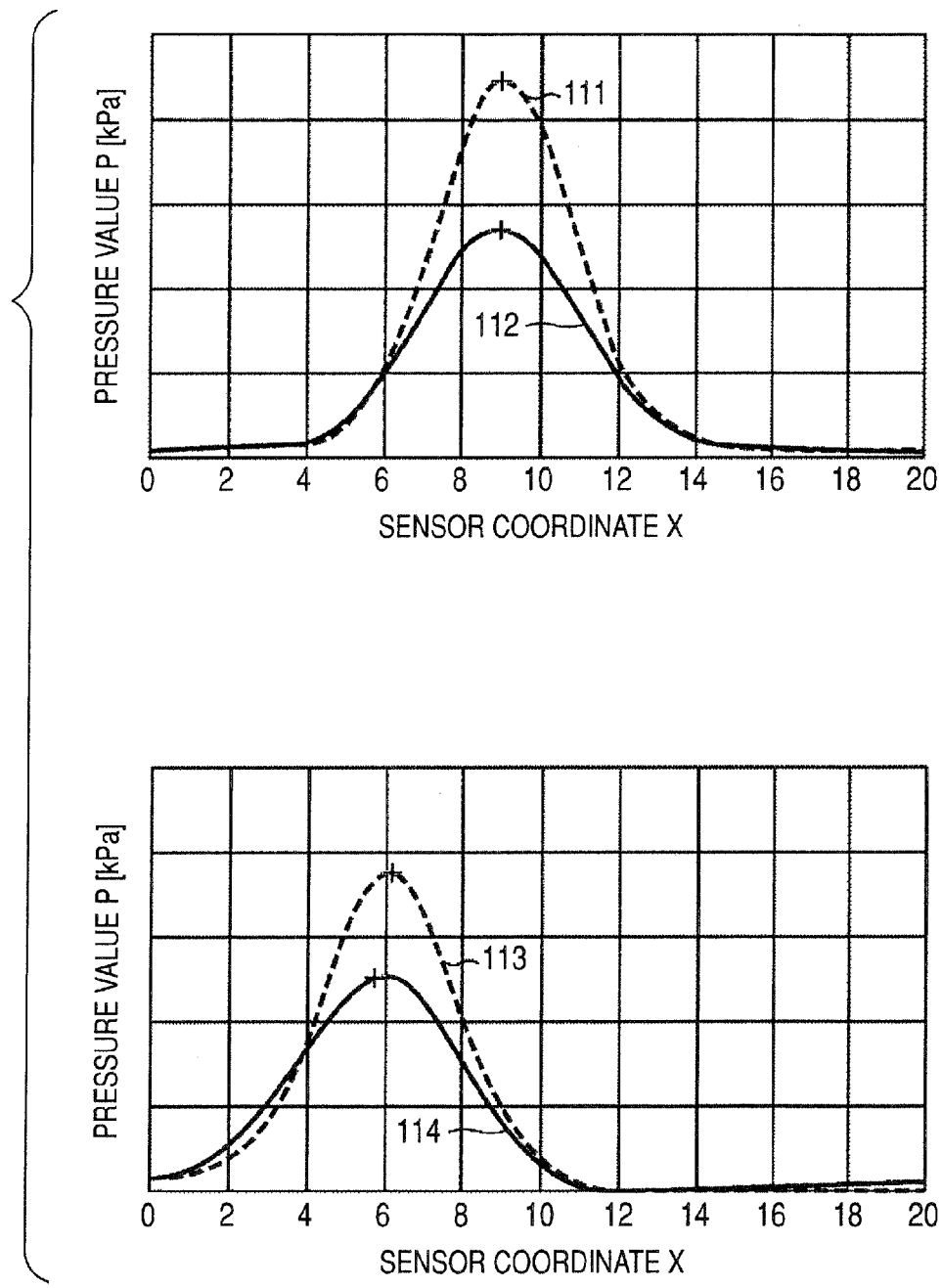
FIG. 11 is a diagram showing graphs of a pressure value and a position in the case of FIG. 10.

Pressure distributions before shifting and after shifting are shown in FIG. 11. The pressure distribution before shifting (on an upper side of the figure) has a substantially symmetrical curved shape with the pressure values in the pressure center positions C and D set as the maximum and pressure values at both ends of a distribution range of pressure values set as the minimum. However, in a pressure distribution after shifting (on a lower side of the figure), a distribution range of pressure values is narrower than that before shifting. Moreover, the pressure center positions C and D before shifting are in positions slightly shifted in the minus direction of the x axis. The pressure distribution has a shape gently curved more in the minus direction of the x axis than in the plus direction of the x axis.

A curve 111 in FIG. 11 indicates a pressure distribution before shifting detected by the pressure detecting unit 42-1, a curve 112 indicates a pressure distribution before shifting detected by the pressure detecting unit 42-2, a curve 113 indicates a pressure distribution after shifting detected by the pressure detecting unit 42-1, and a curve 114 indicates a pressure distribution after shifting detected by the pressure detecting unit 42-2.

In this way, an amount of deformation of the pressure distribution increases depending on a magnitude of the shearing force Fs. Therefore, even if a contact area between the viscoelastic body of the input section 31 (the deforming section 41) and the contact object (the pressure tip A) is generally unchanged, a "slip" in a broad sense can be grasped. Therefore, when gripping is performed by the robot hand 1, it can be said that this is more effective to detect a slip in a state of "shift" and perform gripping force control than performing gripping force control on the basis of a complete relative motion between the viscoelastic body of the input section 31 and the contact object.

Subsequently, attention is paid to a change in pressure center positions of the pressure detecting unit 42-1 and the pressure detecting unit 42-2 due to the shifting operation.

As shown in FIG. 8, when the load Fz in the minus direction of the z axis is applied to the input section 31, the deforming section 41 is deformed. However, the pressure center position C of the pressure detecting unit 42-1 and the pressure center position D of the pressure detecting unit 42-2 are in the same position around the graduation 9.

However, when the shifting operation in the minus direction of the x axis is performed by the shearing force Fs (i.e., the entire sensor 21 is moved in the left direction in the figure while positions on the y axis and the z axis are maintained) as shown in FIG. 10, the pressure center position C of the pressure detecting unit 42-1 changes to about a graduation 6 and the pressure center position D of the pressure detecting unit 42-2 changes to about a graduation 5.8. A difference of about 0.2 (hereinafter referred to as distance d) occurs between both the pressure center positions.

Figure 12:
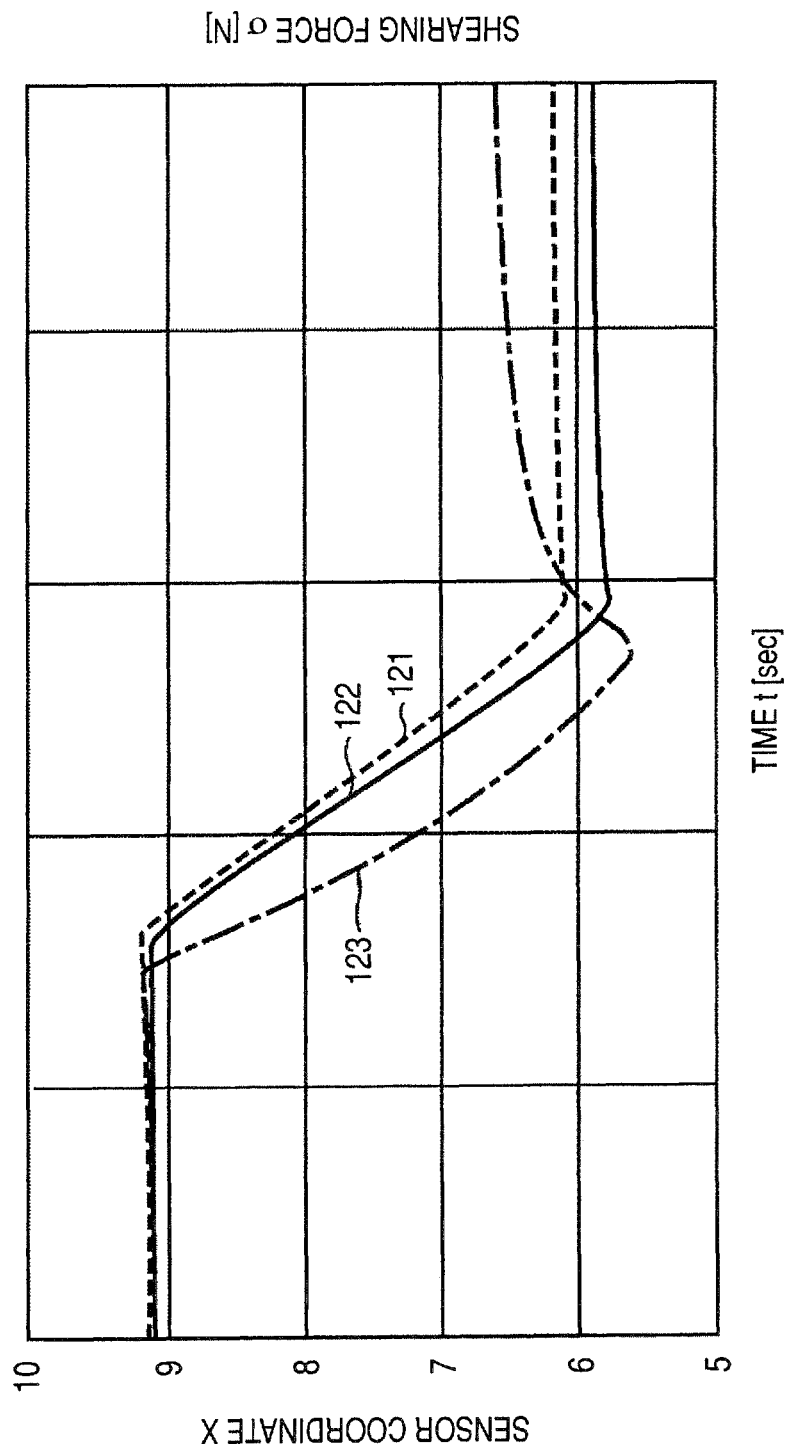
FIG. 12 is a diagram showing a graph of a center pressure position and time.

This difference is also evident from the fact that, although positions of cross marks (+) indicating positions of pressure centers on the curve 111 and the curve 112 on the upper side of FIG. 11 coincide with each other, positions of cross marks (+) indicating positions of pressure centers on the curve 113 and the curve 114 on the lower side of FIG. 11 shift from each other. In FIG. 12, the pressure center position C of the pressure detecting unit 42-1, the pressure center position D of the pressure detecting unit 42-2, and a shearing force at the time when this shifting operation is performed are shown according to the elapse of time. The difference described above is also evident from the fact that there is a difference between the pressure center position C (a curve 121) of the pressure detecting unit 42-1 and the pressure center position D (a curve 122) of the pressure detecting unit 42-2 at the time when the shearing force (a curve 123) is substantially fixed.

Figure 13:
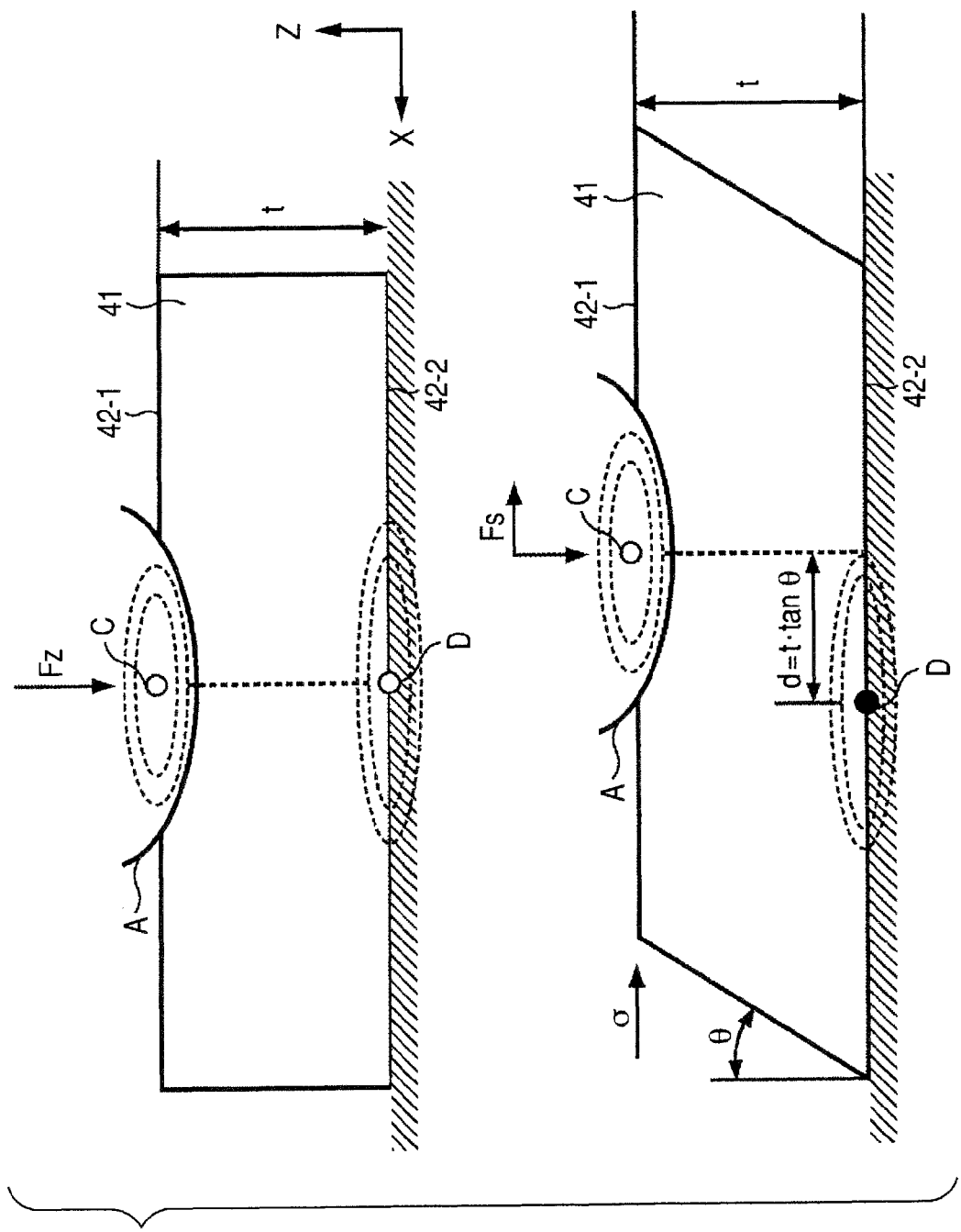
FIG. 13 is a diagram showing models of a pure shearing stress state.

FIG. 13 is a diagram showing the states in FIG. 10 as models of a pure shearing stress state. Dotted lines surrounding the pressure center position C of the pressure detecting unit 42-1 and the pressure center position D of the pressure detecting unit 42-2 schematically indicate contour lines of pressure.

A model on an upper side of the figure indicates that, as described above, the pressure center position C of the pressure detecting unit 42-1 and the pressure center position D of the pressure detecting unit 42-2 are in a relation in which the pressure center positions coincide with each other on a sensor matrix (an XY plane) in a state in which the shearing force Fs does not act.

A model on a lower side of the figure indicates that, when the shearing force Fs (a shearing stress σ) is further applied in the minus direction of the x axis, in a state in which a slip against the pressure tip A does not occur on the surface of the sensor 21, as described above, a difference occurs on the sensor matrix between the pressure center position C of the pressure detecting unit 42-1 in the upper layer and the pressure center position D of the pressure detecting unit 42-2 in the lower layer.

According to these models, when a modulus of rigidity of a material is represented as G and the thickness of the deforming section 41 is represented as t, t×tan θ is the distance d and the shearing stress a is represented by formula (15). When a shearing stress in the y axis direction is generated, the same shift amount is generated on the plane.

$$\sigma = G \times t \times \tan\theta \quad (15)$$

Therefore, at this point, a position corresponding to the pressure center position C of the pressure detecting unit 42-1 on the sensor matrix (the XY plane) of the pressure detecting unit 42-2 is set in a position corresponding to the pressure center position C of the pressure detecting unit 42-1 on the sensor matrix of the pressure detecting unit 42-2 before the shifting operation (i.e., in the case of these models, a position same as the pressure center position D of the pressure detecting unit 42-2 before the shifting operation). The pressure center position D of the pressure detecting unit 42-2 after the shifting operation is set in a pressure center position calculated from a distributed pressure value detected after the shifting operation by the pressure detecting unit 42-2. Then, the main control unit 101 can calculate "t×tan θ" on the basis of information on those positions. Therefore, the shearing stress a can be calculated from formula (15).

In other words, according to this embodiment, a slip in a broad sense can be detected according to a pressure distribution generated because the deforming section 41 is a viscoelastic body. A shearing stress at that point can be detected. Therefore, it is possible to accurately acquire information on a slip necessary for stable gripping, skillful manipulation, and the like of an object by a robot hand.

In the above explanation, a slip is regarded as being detected when the slip sense detection value calculated by the formula (9) exceeds the threshold for judgment. However, it is also possible to regard a slip as being detected when a difference (the distance d) between the pressure center position C of the pressure detecting unit 42-1 and the pressure center position D of the pressure detecting unit 42-2 reaches an amount equal to or larger than a fixed amount or when the distance d reaches an amount equal to or larger than the fixed amount at speed equal to or higher than fixed speed.

Further, for example, it is also possible to calculate a difference of stress propagation speed from the time difference until the statically determinate state obtained from the transition of the pressure center position C of the pressure detecting unit 42-1 and the pressure center position D of the pressure detecting unit 42-2 shown in FIG. 12 and use the difference for slip detection.

In other words, it is possible to more accurately detect a slip in a broad sense.

Figure 14:
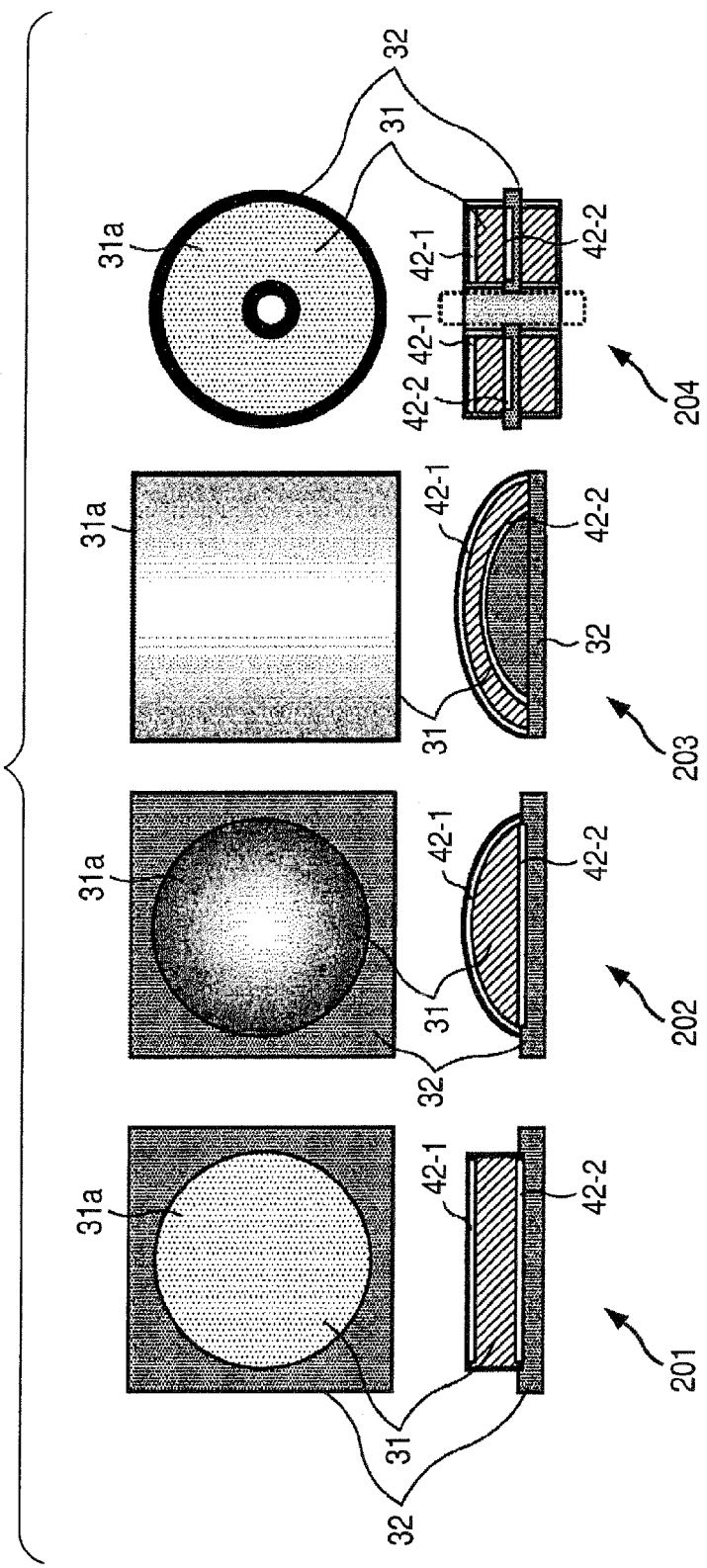
FIG. 14 is a diagram showing another example of the external structure of the sensor shown in FIG. 2.

FIG. 14 shows an example of the external structure of the sensor 21 shown in FIG. 2. In the example in FIG. 14, plan views of sensors 201 to 204 having different shapes of the input section 31 viewed from right above are shown in an upper part of the figure. Sectional views of the sensors 201 to 204 are shown in a lower part of the figure.

The sensor 201 includes the input section 31 of a columnar shape in which an input surface 31a is circular viewed from right above and is square viewed from a side. The sensor 202 includes the input section 31 of a dome shape in which the input surface 31a is circular viewed from right above and is dome-shaped viewed from a side. The sensor 203 includes the input section 31 of a semicylindrical shape in which the input surface 31a is square viewed from right above and is semicylindrical-shaped viewed from a side.

The sensor 204 includes the input section 31 of a columnar shape in which the input surface 31a is doughnut-shaped viewed from right above and is square-shaped viewed from a side with the input section 31 formed above and below the fixing section 32 to hold the fixing section 32. In a hole (hollow) section of a doughnut in the sensor 204, a shaft can be provided as indicated by a dotted line.

As in the sensor 201 and the sensor 202 described above, a shape of the input section 31 can also be formed to form the input surface 31*a* circular.

A shape of the input section 31 viewed from the side can also be a dome shape and a semicylindrical shape like the sensor 202 and the sensor 203. The dome shape and the semicylindrical shape of the sensor 202, the sensor 203, and the like are suitable when the sensors come into contact with an object, for example, when the sensors are provided in the robot hand 1 because an error of detection easily caused when a plane object is brought into contact with the sensors in a plane can be controlled.

Moreover, a shape of the input section 31 can also be a doughnut shape like the sensor 204. In this case, since a shaft can be inserted through a doughnut portion, for example, the input section 31 is suitable for being provided in respective joint sections of the robot hand 1 and the like.

Figure 15:
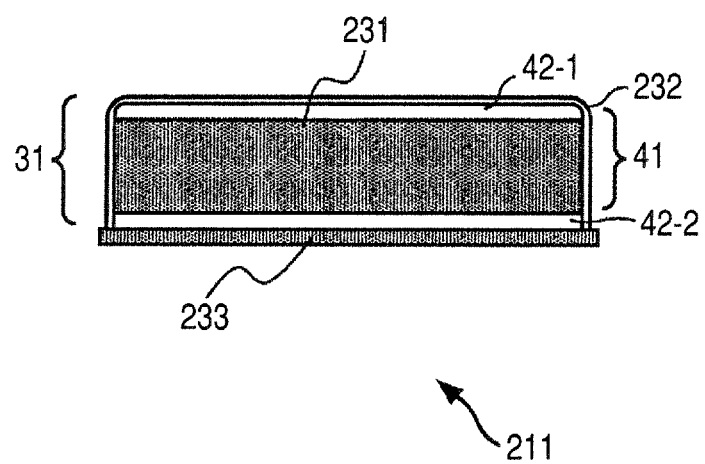
FIG. 15 is a diagram showing another example of a material of the input section shown in FIG. 2.

FIG. 15 shows another example of the material of the input section 31 shown in FIG. 2. In the example in FIG. 15, a side sectional view of a sensor 211 added with an electrostatic shield for preventing leakage and intrusion of static electricity is shown.

The sensor 211 is different from the sensors described above in that the fixing section 32 is replaced with a fixing section 233 having a shield function, the pressure detecting unit 42 is integrated with a viscoelastic body 231 having a shield function of the deforming section 41, and thin-film silicon rubber 232 is integrally formed on a surface of the pressure detecting unit 42 by, for example, a two-color molding method.

The pressure detecting unit 42 is shielded from the viscoelastic body 231 above and the fixing section 233 below the pressure detecting unit 42. Consequently, it is possible to further control the fall in performance of the pressure detecting unit 42.

As explained above, the sensor 21 is configured in a multilayer structure in which the capacitance-type pressure sensor that detects a normal force perpendicular to the sensor surface (the input surface 31*a*) and the viscoelastic material are combined. Signal processing for, for example, calculating a pressure center position is performed by using a pressure value from the sensor 21. Therefore, it is possible to more surely detect a slip of an object by a tangential force orthogonal to the normal force and a direction of the slip. Since the sensor 21 includes the pressure detecting unit 42 in the two layers, it is possible to more accurately calculate a shearing force and improve accuracy of slip detection.

The slip includes not only a "rolling motion" of a complete "relative motion" and a complete "rotational motion" between fingers and an object but also an "initial local slip" and "shift".

Therefore, in the robot hand manipulator shown in FIG. 1 to which the sensor 21 is applied, since the "slip" including the complete "relative motion", the "initial local slip", and the "shift" between the fingers and the object can be detected, it is possible to more surely detect the "slip" than the detection of only a slip in a narrow sense represented by a stick slip phenomenon. Consequently, it is possible to prevent a fall and the like of an object and accurately grip and manipulate (move or carry) an arbitrary object.

Moreover, since the sensor 21 is made of a flexible material, safety for humans is improved and it is possible to realize physical interaction with higher affinity with humans.

It is also possible to apply the sensor 21 to various input devices (e.g., a remote controller) with high affinity with humans for input to a real world machine and a virtual space by using a flexible material with high affinity with humans and having softness and slipping properties in the input unit. For example, it is possible to represent a force and pressure but also slip phenomena such as "shift of a material itself". Therefore, it is conceivable to realize a new-sense human interface having a wider variety of representation input means.

In a robot hand and a manipulator, to skillfully grip and manipulate arbitrary objects having various sizes, shapes, surface states, and weights and perform physical interaction with high affinity with humans, it is necessary that dynamic behaviors of an object such as slips represented by "translation", "rolling", and "shift" and "oscillation" observed at the time of an initial local slip can be detected in addition to "a magnitude, a direction, and a distribution of a force". Moreover, in portions corresponding to fingertips and skins that grip an object, softness (viscoelasticity, super elasticity, and rubber-like feature) optimum for gripping and grippability by friction of a surface are necessary.

On the other hand, in machines (a remote controller, a controller, a switch, etc.) manually operated by humans, in general, a sensor device that accurately detects a finger-tip generated force and a position of the force is necessary. If even movement, a slip, and the like of fingertips can be used as input information, the sensor device can be a new-sense user interface. If places to which the fingertips come into contact are made soft to improve affinity with humans, this also leads to a new-sense user interface.

As described above, the sensor 21 according to this embodiment is configured by a combination of the viscoelastic body and the capacitance-type pressure sensor. Therefore, for example, viscoelastic bodies attached to surfaces of a robot hand and a manipulator and, moreover, an entire robot and having softness like the human skin are changed to various shapes by a force received from the outside and a form of the force. Consequently, when an object comes into contact with the sensors 21, pressure is dispersed to capacitance-type pressure sensors. Consequently, it is possible to calculate a pressure center in a robust manner.

By using this pressure center for sensing of a slip sense of skins of the surfaces of the robot hand and the manipulator and the entire robot, amounts equivalent to a slip direction and slip speed can be acquired by the slip sense. Therefore, it is possible to perform control of object gripping and manipulation control for treating an object while slipping the object with fingertips of the robot hand.

As described above, with the sensor according to this embodiment, there is an effect that it is possible to easily perform accurate gripping and manipulation of an arbitrary object in the robot hand manipulator and there is also an effect that prevention of a fall (slip fall) of an object and safety for humans are realized by contact detection and slip detection. Moreover, because of the soft material, it is possible to easily realize physical interaction with high affinity with humans.

In the above explanation, the pressure detecting unit 42 detects a distributed pressure value using a capacitance change as a detection principle. However, the pressure detecting unit 42 can also be configured to detect a distributed pressure value using not only the capacitance change but also, for example, a resistance change as a detection principle. If a distributed pressure value can be obtained, a sensor configured by simply arranging pressure sensitive rubber may be used.

In the above explanation, the sensors 21 are provided in the arm, the hand, and the like of the robot hand manipulator. However, the present invention can also be applied to fields, products, and the like such as joint mechanism sections of various robots, controllers and joy sticks for games, various input devices, shock absorbing devices, biometric devices, health care products, and sports fields.

It is possible to cause hardware to execute the series of processing or cause software to execute the series of processing.

In causing the software to execute the series of processing, a program configuring the software is installed, from a program recording medium, in a computer incorporated in dedicated hardware or a general-purpose personal computer or the like that can execute various functions by installing various programs.

Figure 16:
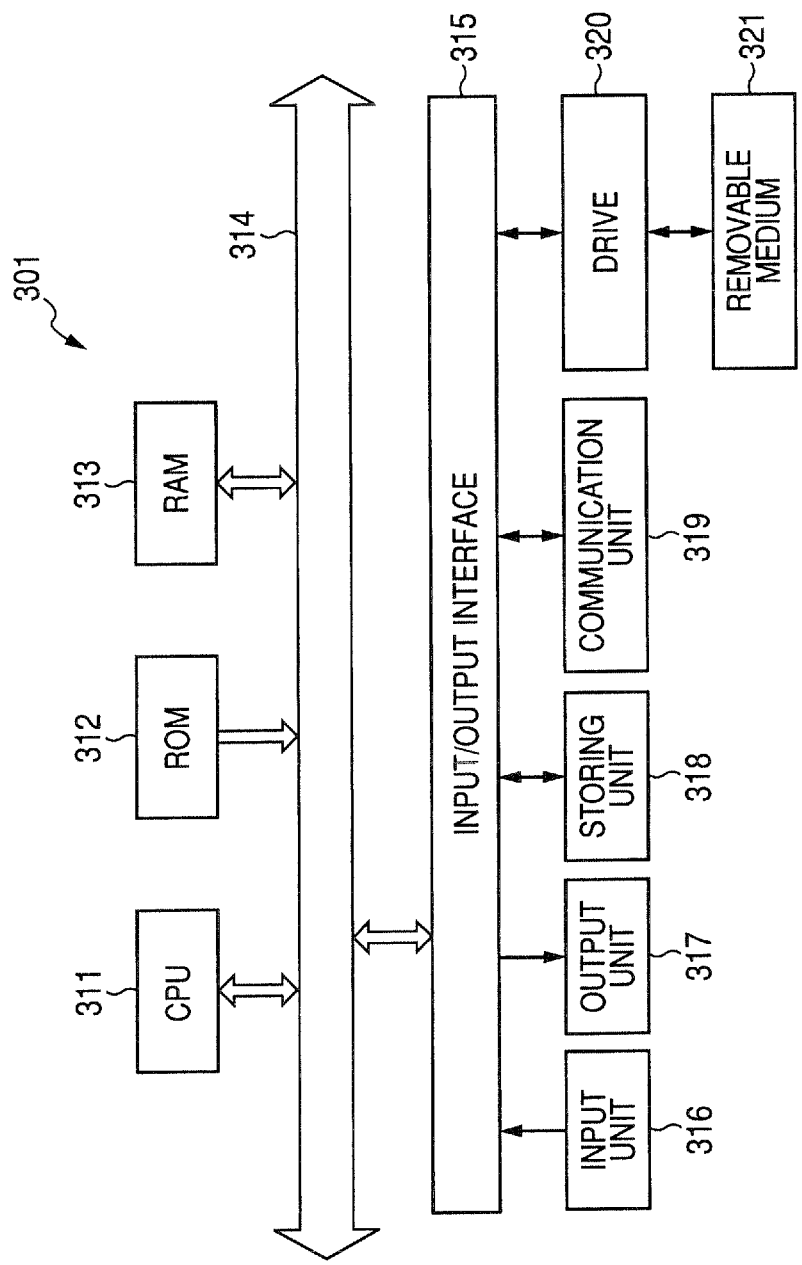
FIG. 16 is a block diagram showing an example of the structure of a personal computer to which the present invention is applied.

FIG. 16 is a block diagram showing an example of the structure of a personal computer 301 that executes the series of processing according to a program. A CPU (Central Processing Unit) 311 executes various kinds of processing according to programs stored in a ROM (Read Only Memory) 312 or a storing unit 318. Programs executed by the CPU 311, data, and the like are stored in a RAM (Random Access Memory) 313 as appropriate. The CPU 311, the ROM 312, and the RAM 313 are connected to one another via a bus 314.

An input/output interface 315 is also connected to the CPU 311 via the bus 314. The sensors 21, an input unit 316 including a keyboard, a mouse, and a microphone, and an output unit 317 including a display and a speaker are connected to the input/output interface 315. The CPU 311 executes various kinds of processing in response to commands inputted from the input unit 316. The CPU 311 outputs a result of the processing to the output unit 317.

The storing unit 318 connected to the input/output interface 315 includes, for example, a hard disk and stores programs executed by the CPU 311 and various data. A communication unit 319 communicates with external apparatuses via networks such as the Internet and a local area network.

A program may be acquired via the communication unit 319 and stored in the storing unit 318.

A drive 320 connected to the input/output interface 315 drives, when a removable medium 321 such as a magnetic disk, an optical disk, a magneto-optical disk, or a semiconductor memory is inserted, the removable medium 321 and acquires programs, data, and the like recorded on the removable medium 321. The acquired programs and data are transferred to the storing unit 318 and stored when necessary.

A program recording medium that stores programs installed in a computer and executable by the computer includes the removable medium 321 as a package medium including a magnetic disk (including a flexible disk), an optical disk (including a CD-ROM (Compact Disc-Read Only Memory) and a DVD (Digital Versatile Disc)), a magneto-optical disk, or a semiconductor memory, the ROM 312 in which programs are temporarily or permanently stored, and the hard disk configuring the storing unit 318. The storage of the programs in the program recording medium is performed by using a wired or wireless communication medium such as a local area network, the Internet, or a digital satellite broadcast via the communication unit 319 as an interface such as a router or a modem when necessary.

In this specification, steps that describe the programs stored in the program recording medium include not only processing performed in time series according to a described order but also processing executed in parallel or individually, although not always executed in time series.

Embodiments of the present invention are not limited to the embodiment described above. Various modifications of the embodiment are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. A detecting device including a pressure sensor that is deformed by a load from an outside, the detecting device comprising:
   a slip detecting unit that calculates a pressure center position using a pressure value detected by the pressure sensor, calculating a movement value of the calculated pressure center position using a temporal change of the pressure center position, and detecting a slip on the basis of the calculated movement value of the pressure center position, wherein
   the pressure sensor has a multilayer structure in which two detecting units that detect pressure are arranged to hold a viscoelastic body made of a viscoelastic material that is deformed by a load from the outside,
   wherein the slip is detected in a state of shift, the state of shift being a state in which the viscoelastic body is shear-deformed by a shifting operation when a contact area between the viscoelastic body and a contact object is unchanged.

2. A detecting device according to claim 1, wherein the state of shift is a state before reaching a state of initial local slip, the state of initial local slip being a state in which an initial local slip occurs in a mixed area of a fixed area and a slipping area when a relative motion gradually occurs from an outer peripheral portion of the contact area.

3. A detecting device according to claim 1, wherein the shifting operation for shifting the contact object is performed by a shearing force while the contact object keeps on depressing the viscoelastic body.

4. A detecting device according to claim 3, wherein an amount of deformation of the pressure distribution varies depending on a magnitude of the shearing force.

5. A detecting device according to claim 1, wherein when the shifting operation is performed by the shearing force, the slip detecting unit calculates a pressure center position from a pressure distribution generated in the viscoelastic body by stress dispersion detected by a first one of the detecting units, calculates a pressure center position from a pressure distribution generated in the viscoelastic body by stress dispersion detected by a second one of the detecting units, and calculate a difference between the pressure center positions.

6. A detecting device according to claim 5, wherein the slip detecting unit detects the slip on the basis of the calculated difference between the pressure center positions.

7. A detecting device according to claim 6, wherein the slip detecting unit detects the slip when the calculated difference between the pressure center positions is equal to or larger than a predetermined threshold.

8. A detecting device according to claim 5, wherein of the shearing force is calculated on the basis of information of the pressure center positions.

9. A detecting device according to claim 1, wherein the slip detecting unit calculates, from a pressure distribution generated in the viscoelastic body by stress dispersion detected by a first one of the detecting units and a pressure distribution generated in the viscoelastic body by stress dispersion detected by a second one of the detecting units, a difference between propagation speed of pressure detected by the first detecting unit and propagation speed of pressure detected by the second detecting unit.

10. A detecting device according to claim 9, wherein the slip detecting unit detects the slip on the basis of the calculated difference between propagation speed of pressure detected by the first detecting unit and propagation speed of pressure detected by the second detecting unit.

11. A robot apparatus comprising:
a pressure sensor that is deformed by a load from an outside;
a slip detecting unit calculating a pressure center position using a pressure value detected by the pressure sensor, calculating a movement value of the calculated pressure center position using a temporal change of the pressure center position, and detecting a slip on the basis of the calculated movement value of the pressure center position; and
a control unit controlling a movement of the robot apparatus according to the slip detected by the slip detecting unit,
wherein the pressure sensor has a multilayer structure in which two detecting units that detect pressure are arranged to hold a viscoelastic body made of a viscoelastic material that is deformed by a load from the outside,
wherein the slip is detected in a state of shift, the state of shift being a state in which the viscoelastic body is shear-deformed by a shifting operation when a contact area between the viscoelastic body and a contact object is unchanged.

12. An input device comprising:
a pressure sensor that is deformed by a load from an outside;
a slip detecting unit calculating a pressure center position using a pressure value detected by the pressure sensor, calculating a movement value of the calculated pressure center position using a temporal change of the pressure center position, and detecting a slip on the basis of the calculated movement value of the pressure center position;
wherein the pressure sensor has a multilayer structure in which two detecting units that detect pressure are arranged to hold a viscoelastic body made of a viscoelastic material that is deformed by a load from the outside,
wherein the slip is detected in a state of shift, the state of shift being a state in which the viscoelastic body is shear-deformed by a shifting operation when a contact area between the viscoelastic body and a contact object is unchanged.

\* \* \* \* \*